(12) United States Patent
Kinoshita et al.

(10) Patent No.: US 8,594,435 B2
(45) Date of Patent: Nov. 26, 2013

(54) IMAGE PROCESSING DEVICE AND METHOD, AND PROGRAM THEREFOR

(75) Inventors: Masaya Kinoshita, Kanagawa (JP); Yutaka Yoneda, Kanagawa (JP); Takashi Kameya, Kanagawa (JP)

(73) Assignee: Sony Corporation, Tokyo (JP)

( * ) Notice: Subject to any disclaimer, the term of this patent is extended or adjusted under 35 U.S.C. 154(b) by 367 days.

(21) Appl. No.: 12/983,516

(22) Filed: Jan. 3, 2011

(65) Prior Publication Data

US 2011/0188758 A1 Aug. 4, 2011

(30) Foreign Application Priority Data

Feb. 4, 2010 (JP) ................................. 2010-022812

(51) Int. Cl.
*G06K 9/00* (2006.01)
(52) U.S. Cl.
USPC .......................................... 382/195; 382/113
(58) Field of Classification Search
USPC ......... 382/181, 190, 195, 113, 100, 154, 294, 382/276, 293, 284, 203, 162, 165; 345/418, 345/619, 629, 631, 632, 630, 633, 634, 635, 345/637, 638, 639, 640; 348/571, 578, 584, 348/585, 586, 587, 591, 592, 597, 598, 348/599; 706/15, 16, 25; 434/130, 150
See application file for complete search history.

(56) References Cited

U.S. PATENT DOCUMENTS

| | | | | |
|---|---|---|---|---|
| 5,506,936 | A * | 4/1996 | Hisano | 706/4 |
| 6,282,317 | B1 * | 8/2001 | Luo et al. | 382/203 |
| 6,295,514 | B1 * | 9/2001 | Agrafiotis et al. | 703/12 |
| 6,453,246 | B1 * | 9/2002 | Agrafiotis et al. | 702/27 |
| 7,188,055 | B2 * | 3/2007 | Agrafiotis et al. | 703/2 |
| 7,212,668 | B1 * | 5/2007 | Luo et al. | 382/165 |
| 7,334,901 | B2 * | 2/2008 | El-Ghoroury | 353/94 |
| 7,623,683 | B2 * | 11/2009 | Chen et al. | 382/107 |
| 7,769,227 | B2 * | 8/2010 | Kigasawa | 382/154 |
| 8,300,135 | B2 * | 10/2012 | Koh | 348/335 |
| 8,345,986 | B2 * | 1/2013 | Nakagomi | 382/195 |
| 2010/0128927 | A1 | 5/2010 | Ikenoue | |
| 2011/0206282 | A1 | 8/2011 | Aisaka et al. | |

FOREIGN PATENT DOCUMENTS

JP 2006-72332 3/2006

OTHER PUBLICATIONS

U.S. Appl. No. 13/321,395, filed Nov. 18, 2011, Kinoshita, et al.
U.S. Appl. No. 13/002,958, filed Jan. 6, 2011, Aisaka, et al.
U.S. Appl. No. 12/999,771.
U.S. Appl. No. 13/023,866, filed Feb. 9, 2011, Kinoshita.

(Continued)

*Primary Examiner* — Sheela Chawan
(74) *Attorney, Agent, or Firm* — Oblon, Spivak, McClelland, Maier & Neustadt, L.L.P.

(57) ABSTRACT

There is provided an image processing device that specifies a region including a specific subject on each input image of a plurality of continuous frames. The image processing device includes: subject map generation means that, from feature maps corresponding to features of respective pixels of the input image and representing feature amounts in respective regions of the input image, selects one feature amount of any of the feature maps for each pixel so as to thereby generate a subject map representing similarities of the respective regions of the input image to the subject; and subject region specification means that, on the basis of the subject map, specifies a subject region, which is a region most similar to the subject, in the subject map so as to thereby specify a region which includes the subject on the input image.

14 Claims, 21 Drawing Sheets

(56) References Cited

OTHER PUBLICATIONS

Extended European Search Report issued Jul. 15, 2011, in Patent Application No. 11151484.0.
P. Salembier, et al., "Region-Based Representations of Image and Video: Segmentation Tools for Multimedia Services", IEEE Transactions on Circuits and Systems for Video Technology, vol. 9, No. 8, XP 11014642, Dec. 1, 1999, pp. 1147-1169.

James Au, et al., "Object Segmentation and Tracking Using Video Locales", Pattern Recognition, 16$^{th}$ International Conference on Quebec City, vol. 2, XP 10613941, Aug. 11, 2002, pp. 544-547.
Stephen DiVerdi, et al., "Heads Up and Camera Down: A Vision-Based Tracking Modality for Mobile Mixed Reality", IEEE Transactions on Visualization and Computer Graphics, vol. 14, No. 3, XP 11203384, May/Jun. 2008, pp. 500-512.

* cited by examiner

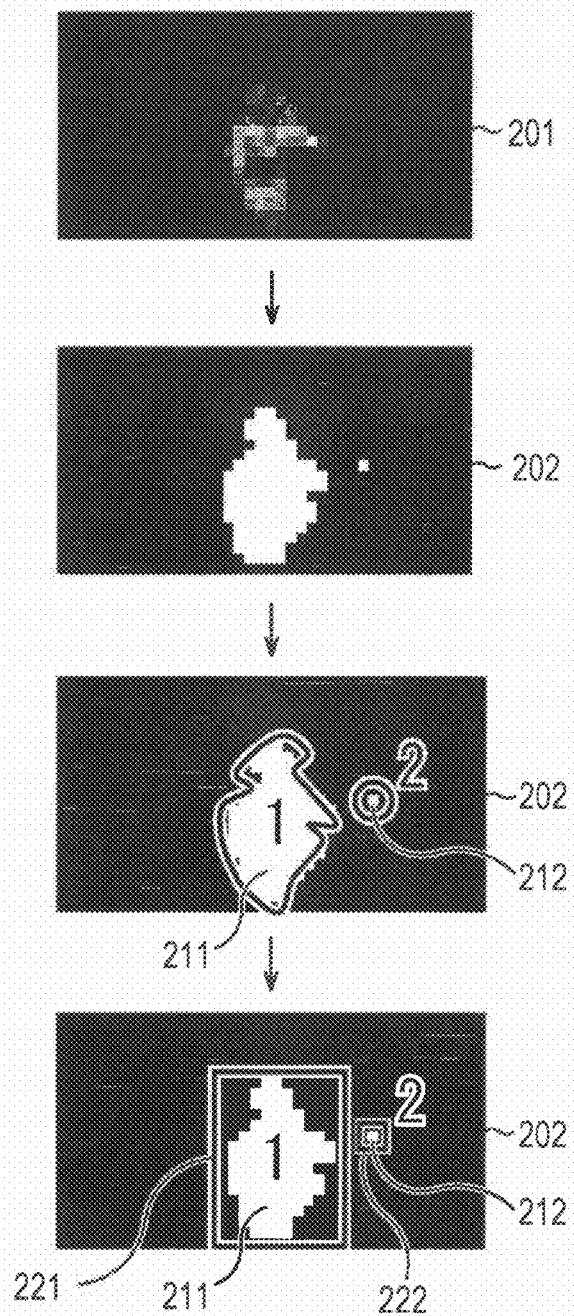

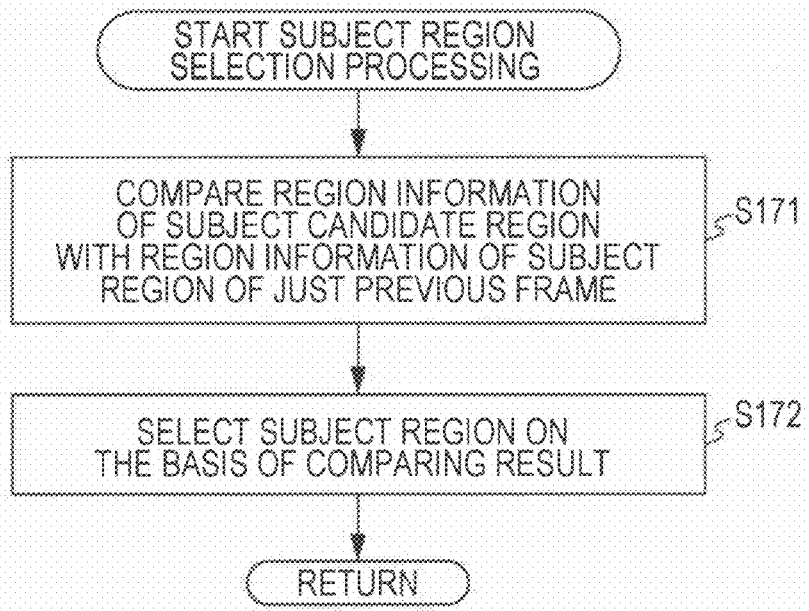

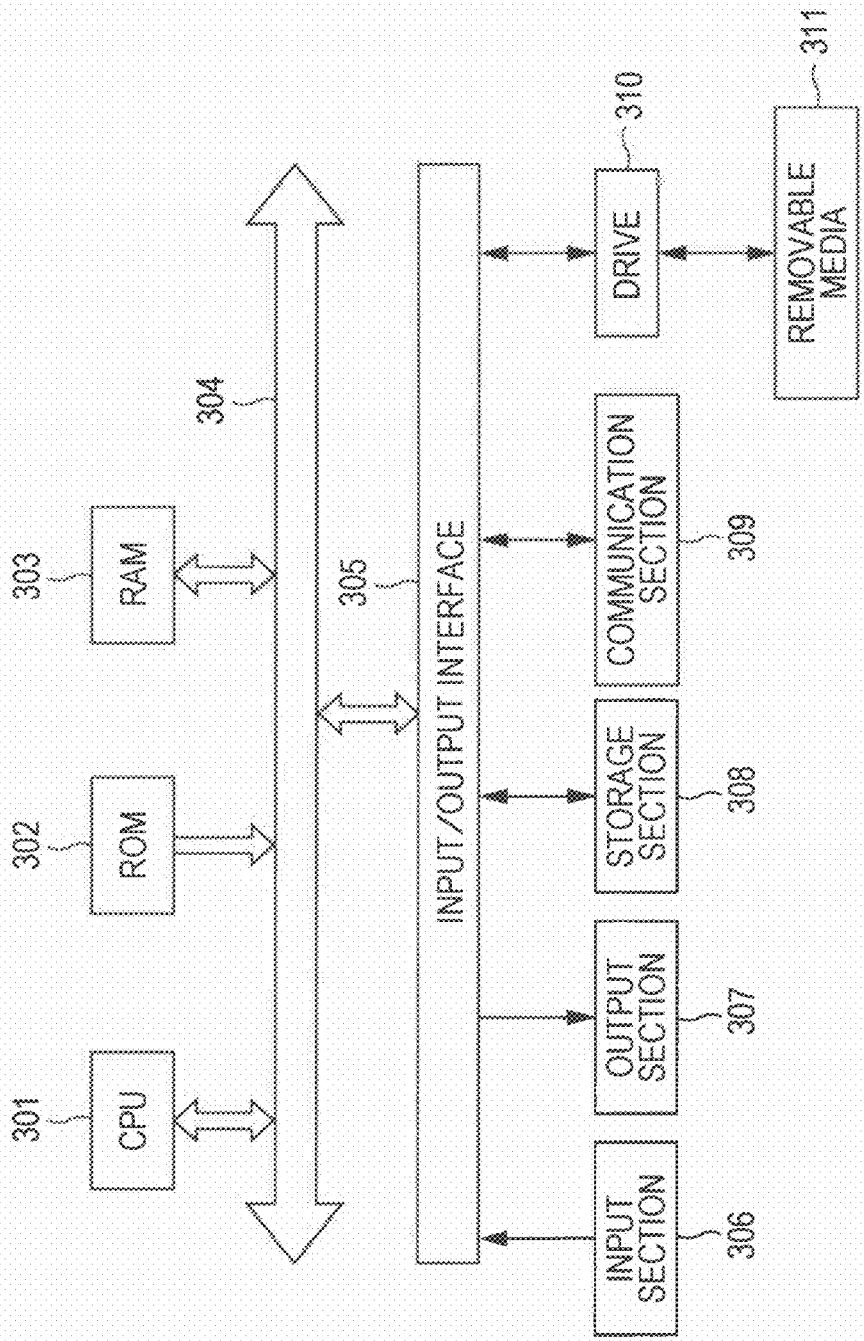

IMAGE PROCESSING DEVICE AND METHOD, AND PROGRAM THEREFOR

BACKGROUND OF THE INVENTION

1. Field of the Invention

The present invention relates to an image processing device and method, and a program therefor, in particular, to an image processing device and method, and a program capable of tracking a subject more stably.

2. Description of the Related Art

In recent related art, there have been image capturing apparatuses that, when successively capturing plural images, for example, when capturing so-called preview images to be displayed to a user before the shutter operation, have a function of tracking a subject, which is selected by a user, on the captured images. In such image capturing apparatuses, some apparatuses have a function of optimally adjusting parameters, such as focal position and luminance, for image capturing in accordance with the position of the tracked subject.

As a method of tracking a subject, for example, there is a method of extracting amounts of features such as luminance information and color information from a region of a part of a subject initially selected by a user in a prescribed frame of an input image and searching for regions which have feature amounts matching with the extracted feature amounts in frames subsequent to the prescribed frame (for example, refer to Japanese Unexamined Patent Application Publication No. 2006-72332). That is, in this method, in the input images of the subsequent frames, regions with feature amounts, which match with the feature amounts of the region of the subject, are searched from the vicinity of the region at the same position as the region initially selected as the subject, and the regions, which can be obtained by the result of the search, are treated as the regions of the subject of the subsequent frames.

SUMMARY OF THE INVENTION

However, in the above-mentioned method, the subject is tracked on the basis of the feature amounts extracted from the region of a part of the subject which is initially selected by the user. Therefore, only a part of the region or coordinates of any position in the entire subject is indentified, and thus it is difficult to perform tracking with the entire subject stabilized.

Further, at the time of capturing the image of the subject, sometimes there may be a change in a subject state such as the light (for example, a color temperature and illumination intensity) for illuminating the subject, the pose of the subject, or the size of the subject (the distance between the image capturing apparatus and the subject) on the input image. In such a case, when the feature amount obtainable from the region of the part used in tracking is changed in the subject selected by the user, it is difficult to specify the region of the subject on the input image. Thus, tracking the subject is likely to fail.

For example, when the color information is extracted from the region of the part of the subject selected as the feature amount by the user, the region with the color information is tracked as a subject. However, when the region used in tracking is concealed due to for example rotation of the subject, the region with the color information is absent on the input image, and thus it is difficult to track the subject. Such failure in tracking may occur even under a circumstance of low illumination intensity where it is difficult to obtain the luminance information and the color information as the feature amounts.

Embodiments of the invention have been made in consideration of the above situation, and are addressed to more stably track the subject.

According to a first embodiment of the invention, there is provided an image processing device that specifies a region including a specific subject on each input image of a plurality of continuous frames. The image processing device includes: a subject map generation portion that, from feature maps corresponding to features of respective pixels of the input image and representing feature amounts in respective regions of the input image, selects one feature amount of any of the feature maps for each pixel so as to thereby generate a subject map representing similarities of the respective regions of the input image to the subject, and a subject region specification portion that, on the basis of the subject map, specifies a subject region, which is a region most similar to the subject, in the subject map so as to thereby specify a region which includes the subject on the input image.

In the image processing device, it is preferable to further provide a reliability calculation portion that calculates reliabilities as indicators indicating that corresponding regions, which correspond to the subject region of a frame previous to a processing target frame, on the feature maps includes the subject, on the basis of degrees of distribution of the feature amounts in near-field regions which include the corresponding regions on the feature maps of the processing target frame. In addition, it is also preferable that the subject map generation portion should generate the subject map by selecting one feature amount of any of the feature maps for each pixel on the basis of the reliabilities of the respective feature maps.

In the image processing device, it is preferable to further provide: a reference map retaining portion that retains regions, which are at the same positions as the subject region in the feature maps, as reference maps; and a matching processing portion that searches the feature maps of the processing target frame for most similar regions which are most highly correlated with the reference maps of the previous frame. In addition, it is also preferable that the reliability calculation portion should calculate the reliabilities as indicators indicating that the most similar regions on the feature maps includes the subject, on the basis of the degrees of distribution of the feature amounts in the near-field regions which include the most similar regions on the feature maps of the processing target frame.

It is preferable that the subject map generation portion should generate the subject map by selecting one feature amount of any of the feature maps, of which the reliabilities are larger than a predetermined threshold value, for each pixel.

It is preferable that the subject map generation portion includes: a feature map generation portion that extracts the feature amounts from the input image so as to thereby generate the feature maps in the respective regions of the input image; a band feature map generation portion that, for each of a plurality of bands, extracts a component of the band from the feature maps so as to thereby generate band feature maps as the feature maps representing the components of the bands; a band-feature map synthesis portion that synthesizes the band feature maps for each of the feature amounts so as to thereby generate synthetic feature maps; and a synthetic-feature map synthesis portion that synthesizes the synthetic feature maps so as to thereby generate the subject map as another feature map. In addition, it is also preferable that the reliability calculation portion should calculate the reliabilities of the synthetic feature maps on the basis of degrees of distribution of synthetic feature amounts in the near-field regions, which correspond to the subject region of the previous frame, on the synthetic feature maps of the processing target frame. Further, it is also preferable that the synthetic-feature map synthesis portion should generate the subject map by selecting one synthetic feature amount of any of the synthetic feature maps for each pixel on the basis of the reliabilities of the respective synthetic feature maps and by synthesizing the synthetic feature amounts for all pixels.

It is preferable that the reliability calculation portion should calculate the reliabilities of the band feature maps on the basis of degrees of distribution of band feature amounts in the near-field regions, which correspond to the subject region of the previous frame, on the band feature maps of the processing target frame. In addition, it is also preferable that the band-feature map synthesis portion should generate the synthetic feature maps by selecting one band feature amount of any of the band feature maps for each pixel on the basis of the reliabilities of the respective band feature maps and by synthesizing the band feature amounts for all pixels.

It is also preferable that the subject map generation portion should generate the subject map by selecting the maximum feature amount among the feature maps for each pixel.

According to a second embodiment of the invention, there is provided an image processing method of an image processing device that specifies a region including a specific subject on each input image of a plurality of continuous frames. The image processing method includes: a subject map generation step of generating a subject map representing similarities of respective regions of the input image to the subject, through the subject map generation portion, by selecting one feature amount of any of the feature maps for each pixel from the feature maps corresponding to features of the respective pixels of the input image and representing the feature amounts in the respective regions of the input image; and a subject region specification step of specifying a region, which includes the subject on the input image, through the subject region specification portion, by specifying a subject region, which is a region most similar to the subject in the subject map, on the basis of the subject map.

According to a third embodiment of the invention, there is provided an image processing program that specifies a region including a specific subject on each input image of a plurality of continuous frames. The image processing program causes a computer to execute processing including: a subject map generation step of generating a subject map representing similarities of respective regions of the input image to the subject, through the subject map generation portion, by selecting one feature amount of any of the feature maps for each pixel from the feature maps corresponding to features of the respective pixels of the input image and representing the feature amounts in the respective regions of the input image; and a subject region specification step of specifying a region, which includes the subject on the input image, through the subject region specification portion, by specifying a subject region, which is a region most similar to the subject in the subject map, on the basis of the subject map.

In the first embodiment of the invention, from the feature maps corresponding to the features of the respective pixels of the input image and representing the feature amounts in the respective regions of the input image, one feature amount of any of the feature maps is selected for each pixel so as to thereby generate a subject map representing similarities of the respective regions of the input image to the subject. In addition, on the basis of the subject map, the subject region, which is the region most similar to the subject, is specified in the subject map so as to thereby specify the region which includes the subject on the input image.

In the first embodiment of the invention, it is possible to more stably track the subject.

BRIEF DESCRIPTION OF THE DRAWINGS

FIG. 22 is a diagram illustrating a specific example of the subject-candidate region squaring processing;

FIG. 23 is a flowchart illustrating subject region selection processing; and

FIG. 24 is a block diagram illustrating an exemplary configuration of hardware of a computer.

DESCRIPTION OF THE PREFERRED EMBODIMENTS

Hereinafter, an embodiment of the invention will be described with reference to the accompanying drawings.

Exemplary Configuration of Image Processing Device

Figure 1:
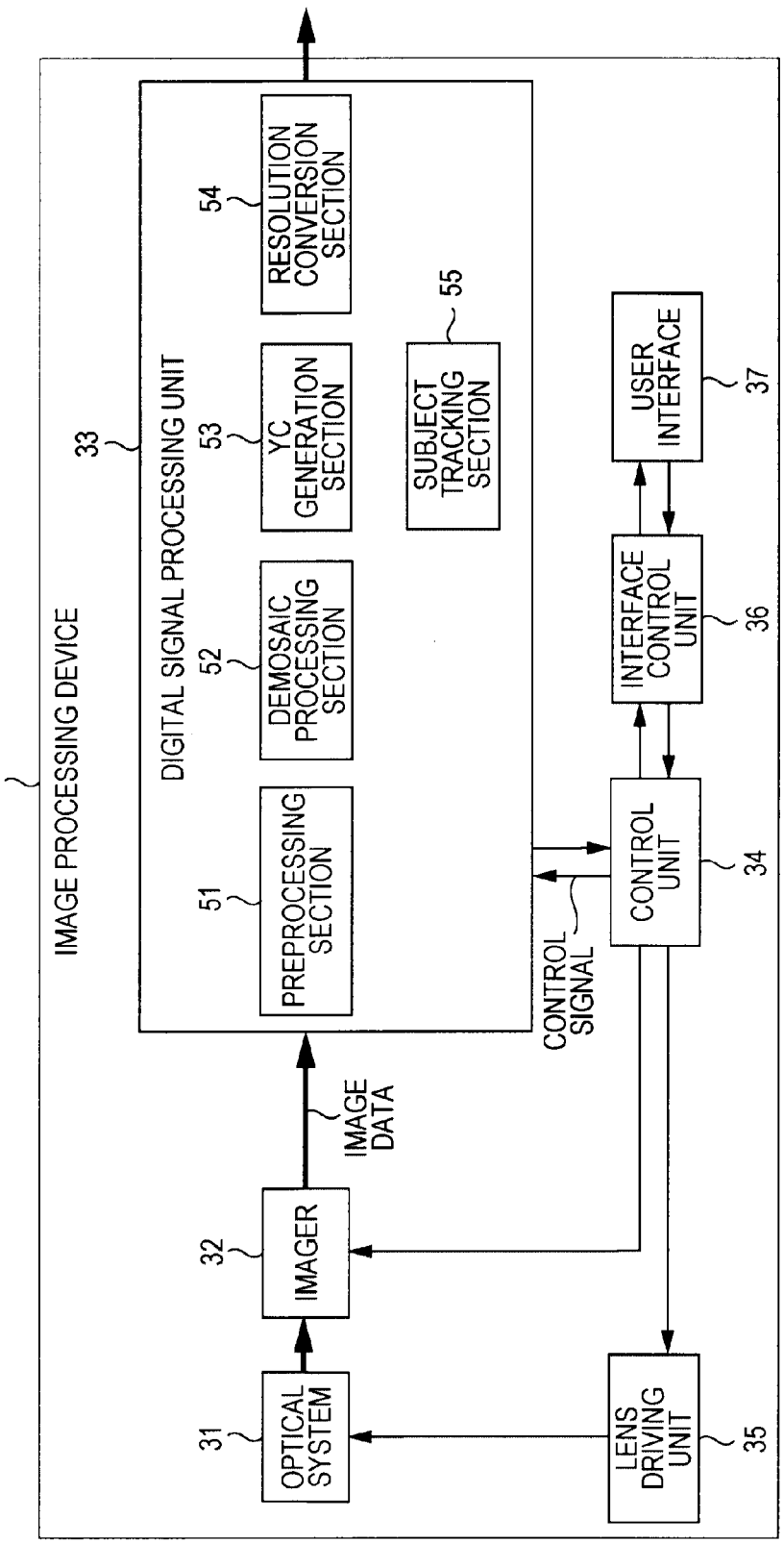
FIG. 1 is a block diagram illustrating an exemplary configuration of an image processing device according to an embodiment of the invention.

FIG. 1 is a block diagram illustrating an exemplary configuration of an image processing device according to the embodiment of the invention.

The image processing device 11 is provided in an image capturing apparatus such as digital video camera or digital still camera for capturing an image of a moving subject.

The image processing device 11 includes an optical system 31, an imager 32, a digital signal processing unit 33, a control unit 34, a lens driving unit 35, an interface control unit 36, and a user interface 37.

The optical system 31 is formed as an optical system including an imaging lens not shown in the drawing. The light incident in the optical system 31 is incident into the imager 32 including an imaging element such as a CCD (Charge Coupled Device). The imager 32 captures an image of the subject by photoelectrically converting the light which is incident from the optical system 31. The imager 32 converts an electric signal (an analog signal), which can be obtained by the image capturing, into image data of a digital signal through an A/D (Analog to Digital) conversion portion which is not shown in the drawing, and supplies the image data to the digital signal processing unit 33.

The digital signal processing unit 33 performs prescribed signal processing on the image data supplied from the imager 32, and outputs the image data to an encoding processing portion not shown in the drawing, a memory, the control unit 34, or the like. The digital signal processing unit 33 includes a preprocessing section 51, a demosaic processing section 52, a YC generation section 53, a resolution conversion section 54, and a subject tracking section 55.

The preprocessing section 51 performs, on the image data supplied from the imager 32, preprocessing such as clamp processing of clamping the black levels of R, G, and B at predetermined levels and correction processing between color channels of R, G, and B. The demosaic processing section 52 performs, on the image data preprocessed by the preprocessing section 51, demosaic processing of supplementing the color components of pixels so that each pixel of the image data has all color components of R, G, and B.

The YC generation section 53 generates (separates) a luminance (Y) signal and a color (C) signal from the image data of R, G, and B subjected to the demosaic processing by the demosaic processing section 52. The resolution conversion section 54 performs resolution conversion processing on the image data processed by the YC generation section 53, and supplies the image data to the control unit 34 or an encoding processing portion not shown in the drawing.

The subject tracking section 55 detects the subject from the input image, which is displayed on the basis of the image data, on the basis of the image data formed of the luminance signal and the color signal which are generated by the YC generation section 53, and performs subject tracking processing of tracking the subject.

The subject tracking section 55 supplies, to the control unit 34, the information, which can be obtained from the result of the subject tracking processing, on the subject range indicating the region including the subject in the input image.

The control unit 34 controls the respective units of the image processing device 11 in response to the control signal supplied from the interface control unit 36.

For example, the control unit 34 supplies parameters used in various kinds of signal processing to the digital signal processing unit 33, acquires data (including the image data) which can be obtained from the result of the various kinds of the signal processing of the digital signal processing unit 33, and supplies the data to the interface control unit 36.

Further, the control unit 34 supplies a control signal for driving the imaging lens constituting the optical system 31 or adjusting the diaphragm to the lens driving unit 35. Furthermore, the control unit 34 controls the imager 32 such that it captures the input image.

The user interface 37 includes an input device such as a button and a switch operated when a user inputs instruction for the image processing device 11, and an output device such as an LCD (Liquid Crystal Display) or a microphone which provides (displays) information to the user.

For example, when the button as the user interface 37 is operated, the user interface 37 supplies the control signal corresponding to the operation to the control unit 34 through the interface control unit 36. Further, the user interface 37 displays the information corresponding to the control signal (data), which is supplied from the control unit 34 through the interface control unit 36, on the LCD as the user interface 37. For example, the LCD displays the input image and the subject range which is the result of the subject tracking processing when the subject on the input image is set as a target of the processing.

Exemplary Configuration of Subject Tracking Section

Next, an exemplary configuration of the subject tracking section 55 shown in FIG. 1 will be described with reference to FIG. 2.

Figure 2:
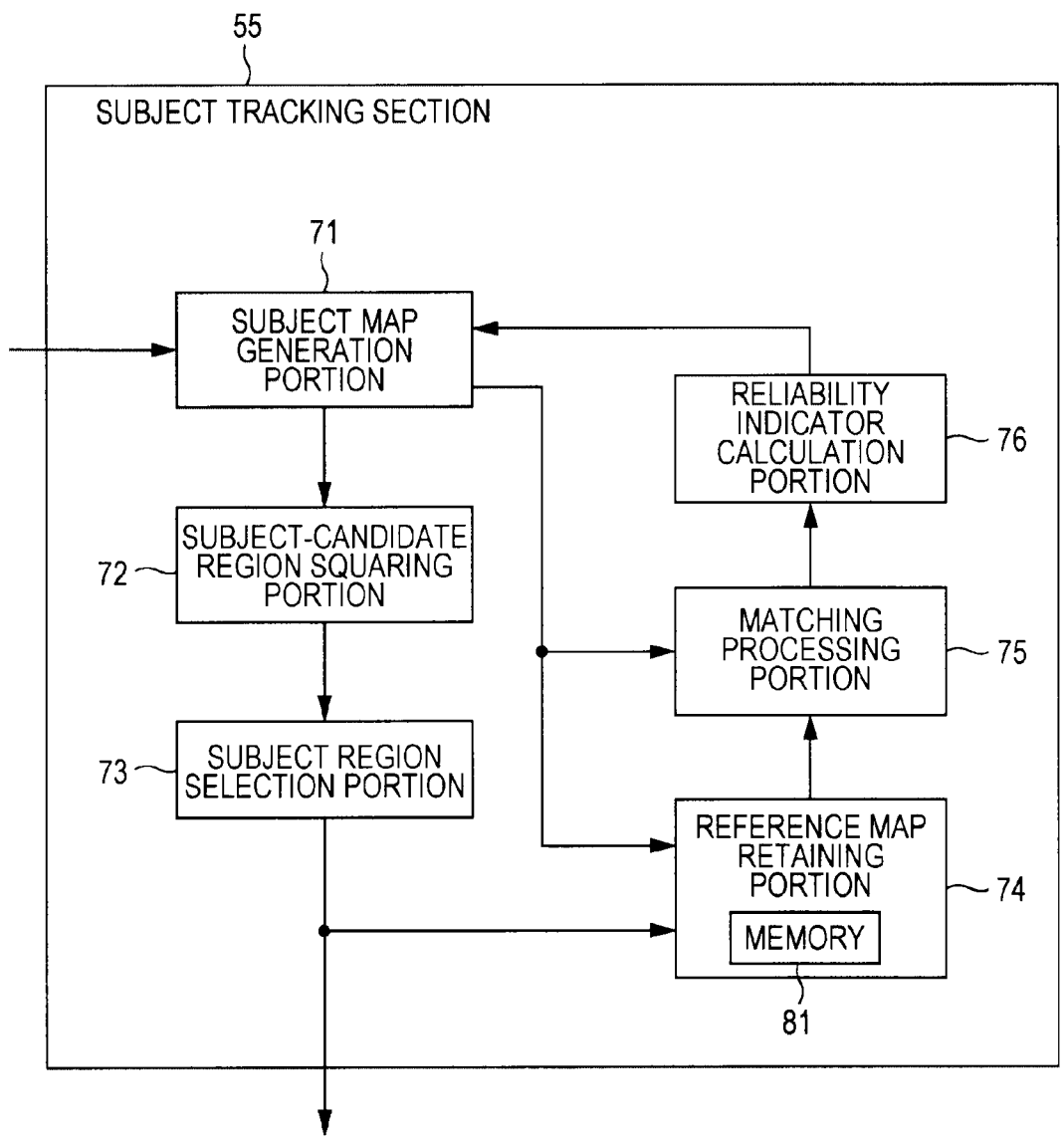
FIG. 2 is a block diagram illustrating an exemplary configuration of a subject tracking section.

The subject tracking section 55 in FIG. 2 includes a subject map generation portion 71, a subject-candidate region squaring portion 72, a subject region selection portion 73, a reference map retaining portion 74, a matching processing portion 75, and a reliability indicator calculation portion 76.

The plural input images, which are captured successively in terms of time by the imager 32 of FIG. 1 and are processed by the preprocessing section 51 to the YC generation section 53, are sequentially supplied to the subject map generation portion 71.

The subject map generation portion 71 supplies generates a feature map representing feature amounts of a feature in the respective regions of the input image for each prescribed feature such as luminance or color of pixels of the input image, and supplies the feature map to the reference map retaining portion 74 and the matching processing portion 75. Further, on the basis of the generated feature maps and the reliability indicators supplied from the reliability indicator calculation portion 76, the subject map generation portion 71 generates a subject map representing similarities of the subject in the respective regions of the input image.

Specifically, the subject map generation portion 71 extracts band components from the feature map generated for each feature so as to generate a band feature map for each plural band (spatial frequency bands) different from each other, and supplies the band feature maps to the reference map retaining portion 74 and the matching processing portion 75.

Each band feature map is a feature map representing a specific band component of the feature amount of the feature in the respective regions of the input image. In other words, the band feature map represents the feature amount of the feature included in the specific band component of the input image.

Further, the subject map generation portion 71 selects one feature amount of any of the band feature maps of the respective bands, on the basis of the reliability indicators each of which is supplied from the reliability indicator calculation portion 76, for each position corresponding to each pixel of the input image, from the generated band feature maps of the respective bands of each feature.

Hereinafter, in the feature maps (which include the band feature maps and the synthetic feature maps to be described later) and the subject map, the regions (positions) corresponding to the pixels of the input image are simply referred to as pixels.

The subject map generation portion 71 performs synthesis of the feature amounts, each of which is selected for each pixel from the band feature map of each band, on all pixels for each feature amount. Thereby, the subject map generation portion 71 generates synthetic feature maps, and supplies the synthetic feature maps to the reference map retaining portion 74 and the matching processing portion 75.

Each synthetic feature map is a feature map representing subject similarity, which is obtained from the feature amounts of each feature, at the respective regions of the input image. In addition, the subject described herein is defined as a subject for which it is estimated that a user focuses thereon, that is, a subject for which it is estimated that a user has an interest therein when the user views the input image. Accordingly, the subject is not limited to a person.

Further, the subject map generation portion 71 selects one synthetic feature amount of any of the synthetic feature maps, on the basis of the reliability indicators each of which is supplied from the reliability indicator calculation portion 76, for each pixel, from the synthetic feature map of each feature. Then, the subject map generation portion 71 synthesizes the selected synthetic feature amounts for all pixels, thereby generating the subject map. The subject map generation portion 71 supplies the generated subject map to the subject-candidate region squaring portion 72. The information (values) of the respective regions (pixels) of the subject map that can be obtained as described above represents similarities to the subject at the respective regions of the input image.

The reliability indicator supplied from the reliability indicator calculation portion 76 will be described in detail later.

The subject-candidate region squaring portion 72 finds a region as a candidate of the subject, that is, a rectangular region (hereinafter referred to as a subject candidate region) including a region similar to the subject, in the subject map generated from the subject map generation portion 71, and generates coordinate information representing the position of the rectangular region.

Further, the subject-candidate region squaring portion 72 generates region information representing feature amounts of the specific feature belonging to the subject candidate regions on the basis of the subject map. Then, the subject-candidate region squaring portion 72 supplies the coordinate information and the region information of the subject candidate regions to the subject region selection portion 73.

The subject region selection portion 73 selects one of the subject candidate regions as a tracking target region (hereinafter referred to as a subject region) including the subject on the basis of the coordinate information and the region information supplied from the subject-candidate region squaring portion 72. The subject region selection portion 73 supplies the coordinate information representing the position of the subject region to the control unit 34 and the reference map retaining portion 74.

The subject region represented by the coordinate information which is output from the subject region selection portion 73 is a region most similar to the tracking target subject in the subject map. Specifically, in the subject tracking section 55, an optional region, for which it is estimated that a user focuses thereon, similar to the subject on the subject map is treated as a candidate (the subject candidate region) of the subject region as the tracking region designated by a user. In addition, the region most similar to the tracking target subject is selected as the subject region from the inside of the subject candidate region, and the region of the input image at the same position as the subject region on the subject map is specified as the region including the tracking target subject.

It should be noted that hereinafter the region on the input image at the same position as the subject region on the subject map is simply referred to as the subject region. Further, the tracking target subject is not limited to one designated by the user. However, for example, among the subject candidate regions at the first frame, a region with the largest area, that is, a region which is highest in the evaluation of the subject similarity is treated as the subject region, and the subject included in the subject region may be treated as the tracking target.

The reference map retaining portion 74 includes a memory 81, generates reference maps on the basis of the band feature maps and the synthetic feature maps supplied from the subject map generation portion 71 and the coordinate information supplied from the subject region selection portion 73, and stores the reference maps in the memory 81.

Specifically, the reference map retaining portion 74 cuts out the region at the same position as the subject region in each band feature map, and sets the cutout region as the reference map of the band feature map. Likewise, the reference map retaining portion 74 cuts out the region at the same position as the subject region in each synthetic feature map, and sets the cutout region as the reference map of the synthetic feature map.

Hereinafter, the reference maps of the band feature map and the synthetic feature map are respectively referred to as the band reference map and the synthetic reference map.

The matching processing portion 75 performs the matching processing on the basis of the reference map stored in the memory 81, and searches for the region, which is most highly correlated with (most similar to) the reference map, from the band feature map and the synthetic feature map which are supplied from the subject map generation portion 71.

That is, in the band feature map of the current frame as a processing target, the region, which is most similar to the band reference map of the frame just previous to the current frame, is searched. Further, in the synthetic feature map of the current frame, the region, which is most similar to the synthetic reference map of the previous frame, is searched.

Hereinafter, in the band feature map and synthetic feature map of the current frame, the regions, which are respectively most similar to the band reference map and the synthetic reference map of the previous frame, are referred to as the most similar regions.

The matching processing portion 75 supplies the result of the matching processing performed on the band feature map and the synthetic feature map to the reliability indicator calculation portion 76.

The reliability indicator calculation portion 76 calculates, on the basis of the result of the matching processing obtained from the matching processing portion 75, the degrees of distribution of the feature amounts in the near-field regions including the most similar regions on the band feature maps and the synthetic feature maps of the current frame.

The reliability indicator calculation portion 76 calculates the reliability indicators as indicators indicating that the most similar regions on the band feature maps of the current frame includes the subject on the basis of the degrees of distribution of the feature amounts in the near-field regions including the most similar regions on the band feature maps of the current frame, and supplies the reliability indicators to the subject map generation portion 71.

Further, the reliability indicator calculation portion 76 calculates the reliability indicators as indicators indicating that the most similar regions on the synthetic feature maps of the current frame includes the subject on the basis of the degrees of distribution of the feature amounts in the near-field regions including the most similar regions on the synthetic feature maps of the current frame, and supplies the reliability indicators to the subject map generation portion 71.

Hereinafter, arbitrarily, each reliability indicator for the band feature maps of the current frame is referred to as a band reliability indicator, and each reliability indicator for the synthetic feature maps is referred to as a synthetic reliability indicator.

Exemplary Configuration of Subject Map Generation Portion

Figure 3:
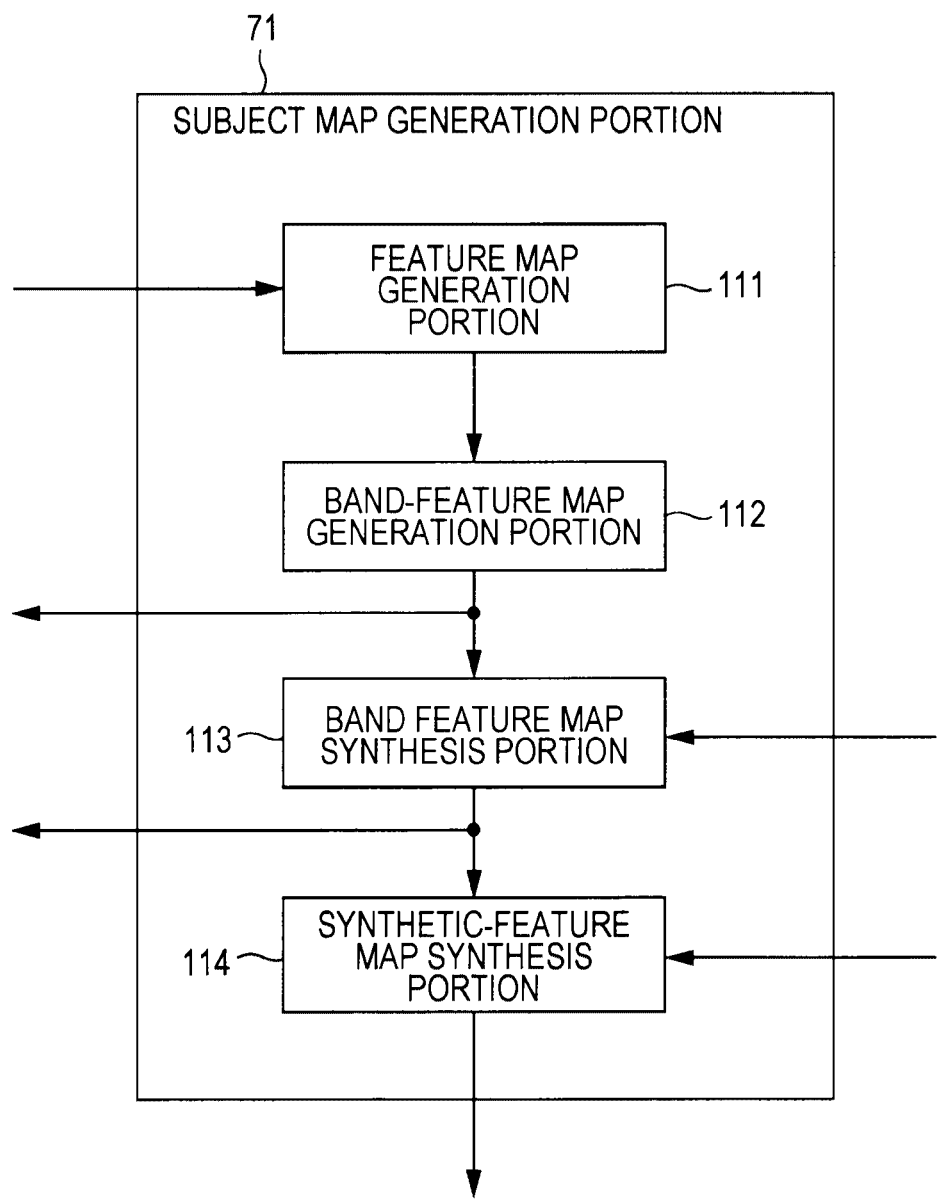
FIG. 3 is a block diagram illustrating an exemplary configuration of a subject map generation portion.

Next, an exemplary configuration of the subject map generation portion 71 of FIG. 2 will be described in detail with reference to FIG. 3.

The subject map generation portion 71 includes a feature map generation portion 111, a band-feature map generation portion 112, a band-feature map synthesis portion 113, and a synthetic-feature map synthesis portion 114.

The feature map generation portion 111 extracts the feature amounts of the features such as luminance and color from the respective regions of the input image so as to generate the feature maps representing the extracted feature amounts, and supplies the feature maps to the band-feature map generation portion 112.

The band-feature map generation portion 112 extracts specific band components of each feature map obtained from the feature map generation portion 111 so as to generate the band feature maps, and supplies the band feature maps to the band-feature map synthesis portion 113, the reference map retaining portion 74, and the matching processing portion 75. The band feature map is generated for each band in each feature.

The band-feature map synthesis portion 113 selects one feature amount of any of the band feature maps on the basis of the band reliability indicators supplied from the reliability indicator calculation portion 76, for each pixel, from the band feature maps corresponding to each feature amount supplied from the band-feature map generation portion 112. The band-feature map synthesis portion 113 generates the synthetic feature maps by synthesizing the feature amounts, each of which is selected for each pixel, for all pixels (the selected feature amounts are employed as the feature amounts of the respective pixels). Consequently, the band feature maps with the same feature are synthesized on the basis of the band reliability indicator, and are formed as a synthetic feature map for each feature.

The band-feature map synthesis portion 113 supplies the synthetic feature maps, each of which is generated for each feature, to the synthetic-feature map synthesis portion 114, the reference map retaining portion 74, and the matching processing portion 75.

The synthetic-feature map synthesis portion 114 selects one feature amount of any of the synthetic feature maps on the basis of the synthetic reliability indicators supplied from the reliability indicator calculation portion 76, for each pixel, from the synthetic feature maps supplied from the band-feature map synthesis portion 113. The synthetic-feature map synthesis portion 114 generates the subject map by synthesizing the feature amounts, each of which is selected for each pixel, for all pixels (the selected feature amounts are employed as the feature amounts of the respective pixels). Consequently, the synthetic-feature map synthesis portion 114 supplies the generated subject map to the subject-candidate region squaring portion 72.

Here, the detailed configurations of the band-feature map synthesis portion 113 and the synthetic-feature map synthesis portion 114 of FIG. 2 will be described with reference to FIGS. 4 and 5.

Exemplary Configuration of Band-Feature Map Synthesis Portion

Figure 4:
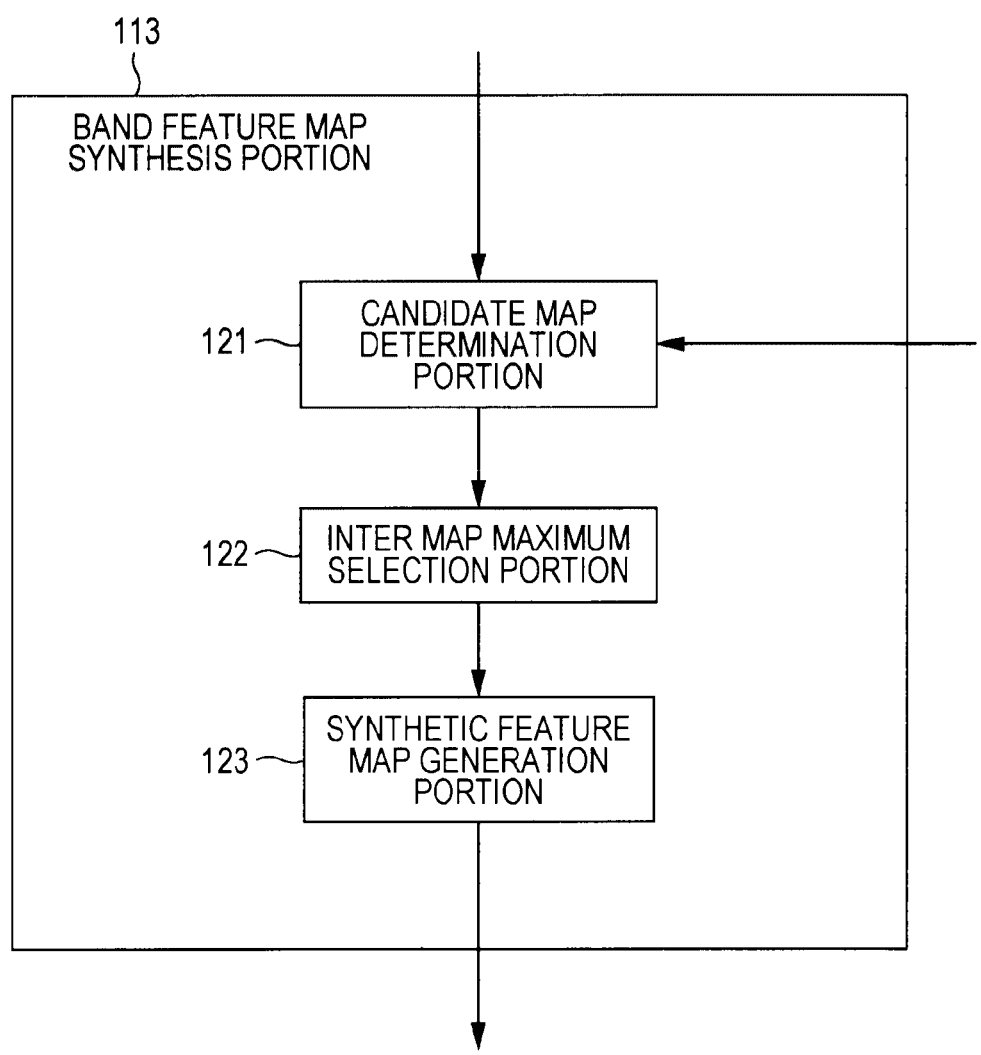
FIG. 4 is a block diagram illustrating an exemplary configuration of a band-feature map synthesis portion.

More specifically, the band-feature map synthesis portion 113 of FIG. 2 is configured as shown in FIG. 4.

That is, the band-feature map synthesis portion 113 includes a candidate map determination portion 121, an inter map maximum selection portion 122, and a synthetic feature map generation portion 123.

The candidate map determination portion 121 determines candidate maps as candidates to be synthesized with the synthetic feature maps on the basis of the band reliability indicators, which are supplied from the reliability indicator calculation portion 76, from the band feature maps of the respective feature amounts supplied from the band-feature map generation portion 112. The candidate map determination portion 121 supplies the determined candidate maps (hereinafter referred to as band candidate maps) to the inter map maximum selection portion 122.

The inter map maximum selection portion 122 selects the maximum feature amount among the band candidate maps, for each pixel, from the band candidate maps supplied from the candidate map determination portion 121, and performs this selection on all pixels.

The synthetic feature map generation portion 123 generates the synthetic feature maps by synthesizing the maximum feature amounts, each of which is selected for each pixel among the band candidate maps by the inter map maximum selection portion 122, for all pixels (the maximum feature amounts are employed as the feature amounts of the respective pixels). Then, the synthetic feature map generation portion 123 supplies the synthetic feature maps to the synthetic-feature map synthesis portion 114, the reference map retaining portion 74, and the matching processing portion 75.

Exemplary Configuration of Synthetic-Feature Map Synthesis Portion

Figure 5:
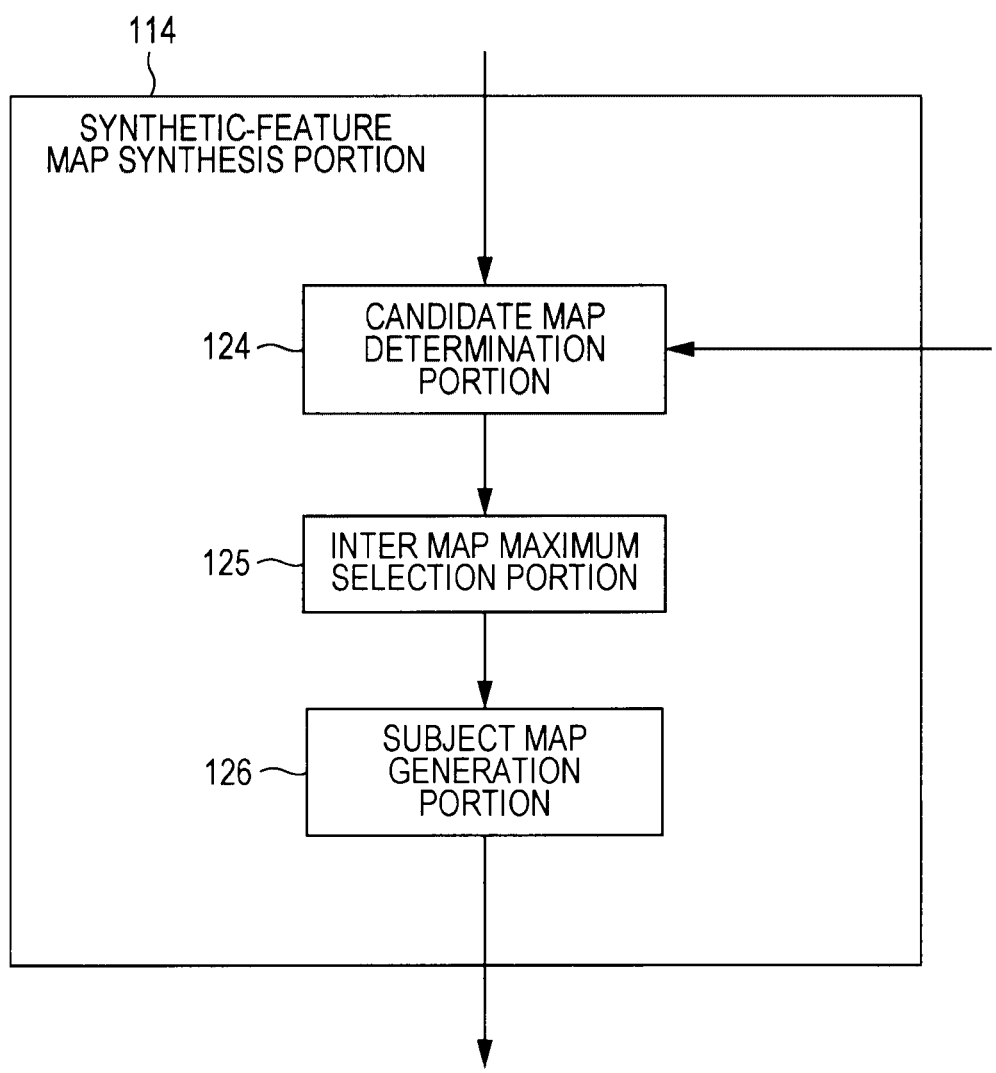
FIG. 5 is a block diagram illustrating an exemplary configuration of a synthetic-feature map synthesis portion.

More specifically, the synthetic-feature map synthesis portion 114 of FIG. 2 is configured as shown in FIG. 5.

That is, the synthetic-feature map synthesis portion 114 includes a candidate map determination portion 124, an inter map maximum selection portion 125, and a subject map generation portion 126.

The candidate map determination portion 124 determines candidate maps as candidates to be synthesized with the subject map on the basis of the synthetic reliability indicators, which are supplied from the reliability indicator calculation portion 76, from the synthetic feature maps supplied from the band-feature map synthesis portion 113. The candidate map determination portion 124 supplies the determined candidate maps (hereinafter referred to as synthetic candidate maps) to the inter map maximum selection portion 125.

The inter map maximum selection portion 125 selects the maximum feature amount among the synthetic candidate maps, for each pixel, from the synthetic candidate maps supplied from the candidate map determination portion 124, and performs this selection on all pixels.

The subject map generation portion 126 generates the subject map by synthesizing the maximum feature amounts, each of which is selected among the synthetic candidate maps by the inter map maximum selection portion 125 for each pixel, for all pixels (the maximum feature amounts are employed as the feature amounts of the respective pixels). Then, the subject map generation portion 126 supplies the subject map to the subject-candidate region squaring portion 72.

Exemplary Configuration of Subject-Candidate Region Squaring Portion

Figure 6:
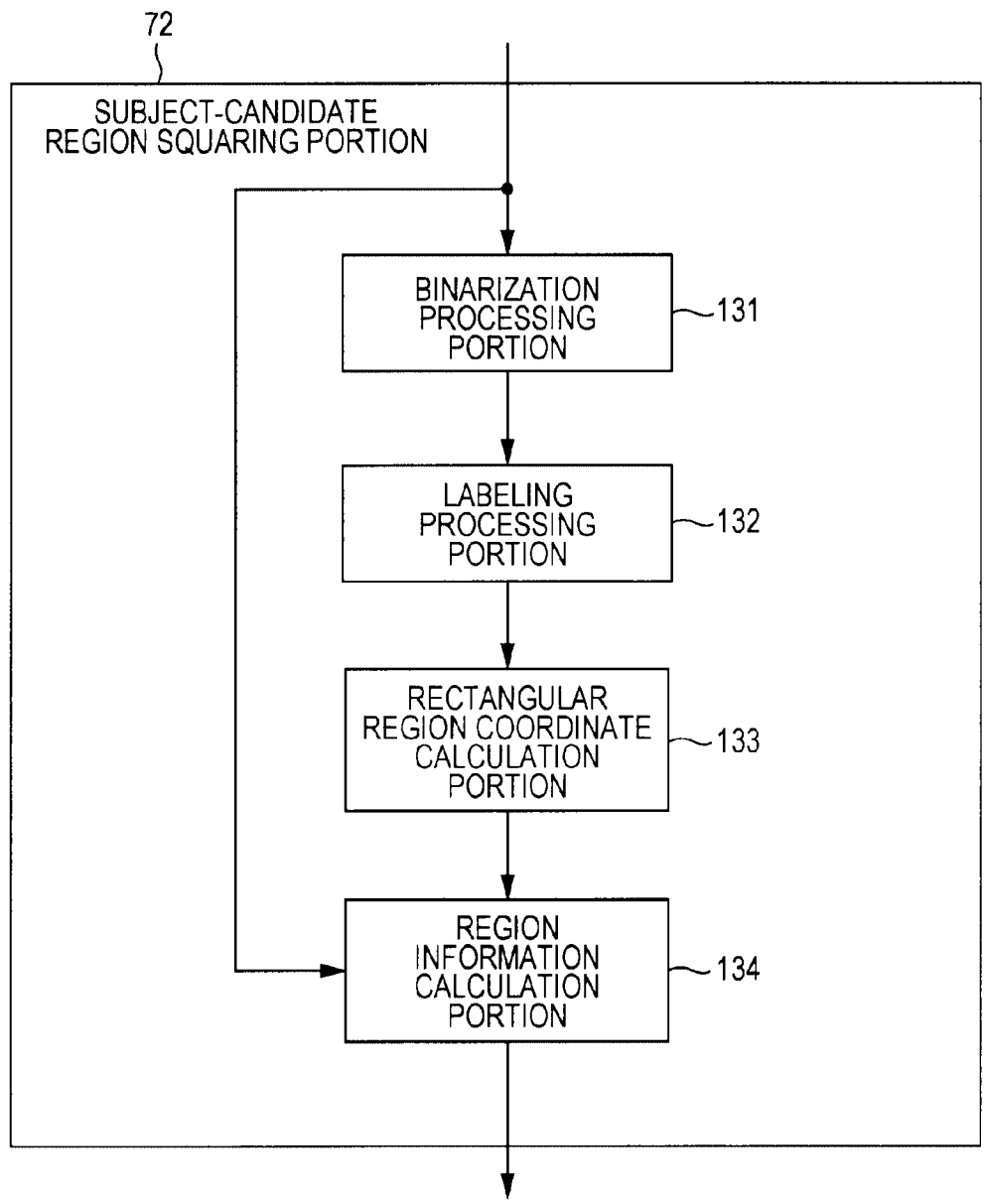
FIG. 6 is a block diagram illustrating an exemplary configuration of a subject-candidate region squaring portion.

Next, an exemplary configuration of the subject-candidate region squaring portion 72 of FIG. 2 will be described in detail with reference to FIG. 6.

The subject-candidate region squaring portion 72 includes a binarization processing portion 131, labeling processing portion 132, a rectangular region coordinate calculation portion 133, and a region information calculation portion 134.

The binarization processing portion 131 binarizes the information corresponding to each pixel of the input image into either one of 0 or 1 on the basis of a predetermined threshold value in the subject map supplied from the synthetic-feature map synthesis portion 114 of the subject map generation portion 71. Then, the binarization processing portion 131 supplies the binarized information to the labeling processing portion 132.

Hereinafter, the information (value) corresponding to each region (pixel) of each of the subject map, the feature map, the band feature map, and the synthetic feature map is simply referred to as a pixel value.

For example, the pixel value of each pixel of the subject map represent the subject similarity of each pixel (the region) of the input image which is at the same position of the pixel of the subject map. In particular, in the binarized subject map, the pixel with a pixel value of "1" is a region similar to the subject, and the pixel with a pixel value of "0" is a region (for example, a background region) which is not the subject. Consequently, the binarized subject map represents the regions similar to the subject in the input image.

The labeling processing portion 132 sets regions, which are adjacent to each other in the binarized subject map supplied from the binarization processing portion 131 and are formed of the pixels with the pixel value of "1", as connection regions, and labels the respective connection regions. Each connection region is a region as a candidate of the subject region. For example, in the labeling, numbers are assigned to the connection regions so as to specify the connection regions. The labeling processing portion 132 supplies the labeled subject map to the rectangular region coordinate calculation portion 133.

The rectangular region coordinate calculation portion 133 sets a rectangular region including (surrounding) each connection region as a subject candidate region in the subject map supplied from the labeling processing portion 132. Then, the rectangular region coordinate calculation portion 133 supplies the coordinate information representing the positions of the respective subject candidate regions to the region information calculation portion 134.

The region information calculation portion 134 generates region information for each subject candidate region on the basis of the coordinate information supplied from the rectangular region coordinate calculation portion 133 and the subject map supplied from the synthetic-feature map synthesis portion 114. Then, the region information calculation portion 134 supplies the coordinate information and the region information of the respective subject candidate regions to the subject region selection portion 73.

Exemplary Configuration of Subject Region Selection Portion

Figure 7:
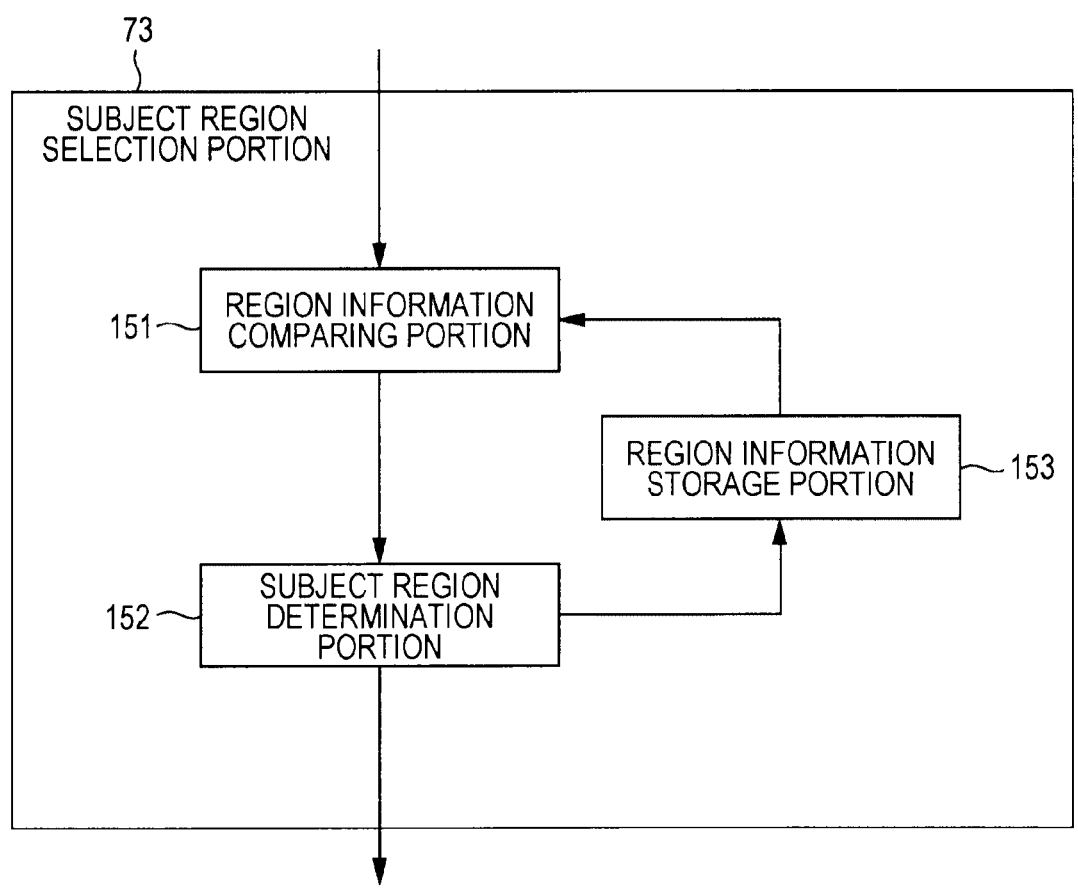
FIG. 7 is a block diagram illustrating an exemplary configuration of a subject region selection portion.

Next, an exemplary configuration of the subject region selection portion 73 of FIG. 2 will be described with reference to FIG. 7.

The subject region selection portion 73 includes a region information comparing portion 151, a subject region determination portion 152, and a region information storage portion 153.

The region information comparing portion 151 compares the region information of the respective subject candidate regions, which is supplied from the region information calculation portion 134, at the current frame as the processing target with the region information of the subject region, which is stored in the region information storage portion 153, at the frame just previous to the current frame. Further, the region information comparing portion 151 supplies the comparing result of the region information on the respective subject candidate regions and the coordinate information supplied from the region information calculation portion 134 to the subject region determination portion 152.

The subject region determination portion 152 sets, on the basis of the comparing result supplied from the region information comparing portion 151, the subject candidate region, which has region information closest to the region information of the subject region of the just previous frame, among the subject candidate regions of the current frame as the subject region of the current frame. That is, when the region information is set as an indicator, the subject candidate region, which is most highly correlated with (most similar to) the subject region of the previous frame, is treated as the subject region of the current frame.

The subject region determination portion 152 supplies the coordinate information of the determined subject region of the current frame to the control unit 34 and the reference map retaining portion 74. In addition, the subject region determination portion 152 supplies the region information of the subject region of the current frame to the region information storage portion 153. The region information storage portion 153 stores the region information, which is supplied from the subject region determination portion 152, and supplies the stored region information to the region information comparing portion 151.

Exemplary Configuration of Subject Region Selection Portion

Figure 8:
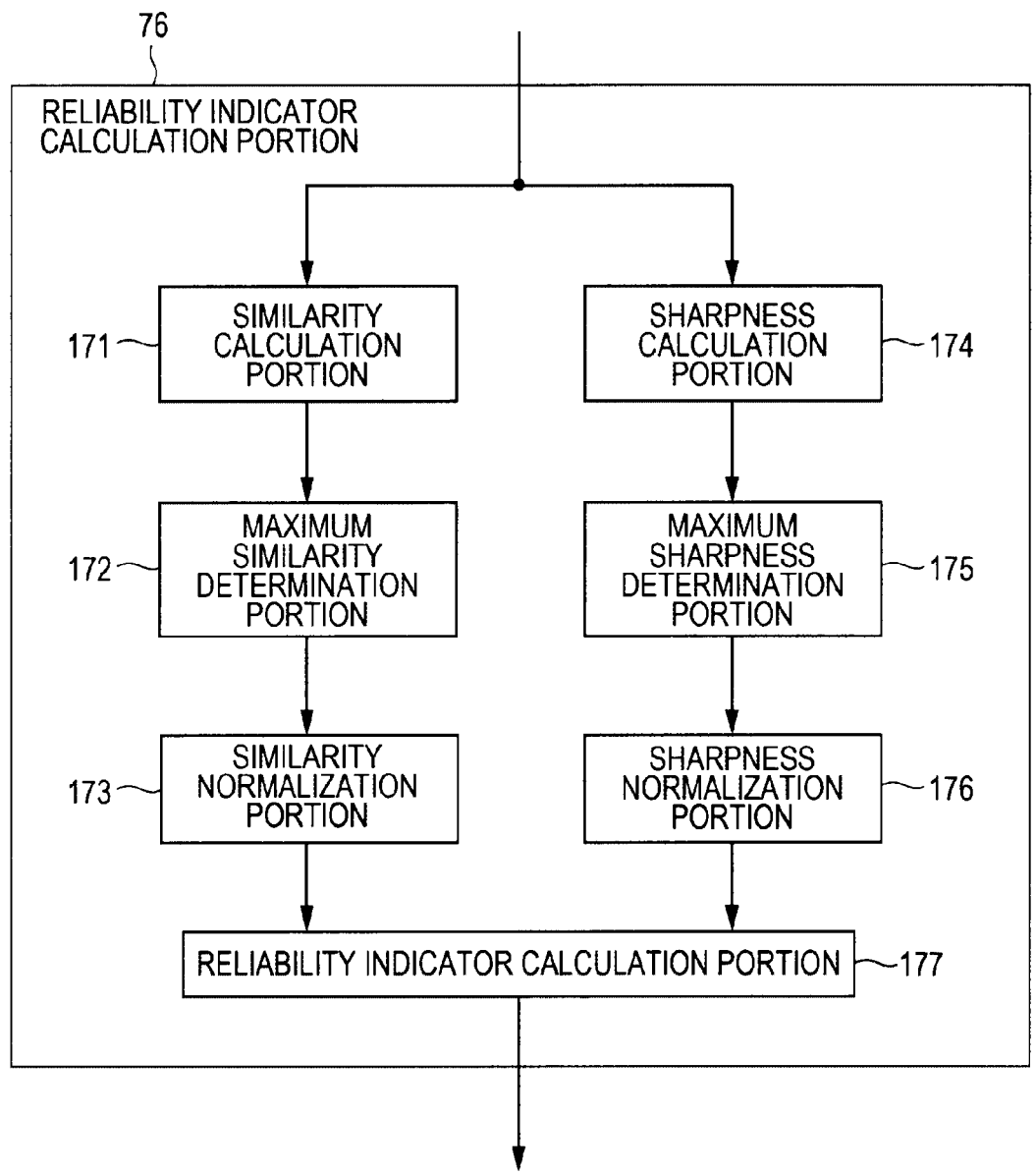
FIG. 8 is a block diagram illustrating an exemplary configuration of a reliability indicator calculation portion.

Next, an exemplary configuration of the reliability indicator calculation portion 76 of FIG. 2 will be described with reference to FIG. 8.

The reliability indicator calculation portion 76 includes a similarity calculation portion 171, a maximum similarity determination portion 172, a similarity normalization portion 173, a sharpness calculation portion 174, a maximum sharpness determination portion 175, a sharpness normalization portion 176, and a reliability indicator calculation portion 177.

The similarity calculation portion 171 calculates, on the basis of the matching processing supplied from the matching processing portion 75, the similarities between the reference map of the previous frame and the most similar regions on the respective feature maps (the band feature map and the synthetic feature map) of the current frame, and supplies the similarities to the maximum similarity determination portion 172.

It should be noted that the similarity between each most similar region and the reference map is one of the values indicating the degrees of distribution of the feature amounts in the near-field regions including the most similar regions on the feature maps. However, the calculation of the similarity will be described in detail later with reference to FIG. 15.

The maximum similarity determination portion 172 determines the maximum similarity, at which the similarity is the maximum, on the basis of the similarities of the respective feature maps supplied from the similarity calculation portion 171, and supplies the maximum similarity to the similarity normalization portion 173 together with the similarities of the respective feature map.

The similarity normalization portion 173 normalizes, on the basis of the maximum similarity supplied from the maximum similarity determination portion 172, the similarities of the respective feature maps, and supplies the normalized similarities to the reliability indicator calculation portion 177.

The sharpness calculation portion 174 calculates, on the basis of the matching result supplied from the matching processing portion 75, the sharpness levels of the respective feature maps of the current frame, and supplies the sharpness levels to the maximum sharpness determination portion 175.

It should be noted that the sharpness level of each feature map is one of values indicating the degrees of distribution of the feature amounts in the near-field regions including the most similar regions on the feature maps. However, the calculation of the sharpness level will be described in detail later with reference to FIG. 15.

The maximum sharpness determination portion 175 determines the maximum sharpness level, at which the similarity is the maximum, on the basis of the sharpness levels of the respective feature maps supplied from the sharpness calculation portion 174, and supplies the maximum sharpness level to the sharpness normalization portion 176 together with the sharpness levels of the respective feature maps.

The sharpness normalization portion 176 normalizes, on the basis of the maximum sharpness level supplied from the maximum sharpness determination portion 175, the sharpness levels of the respective feature maps, and supplies the normalized sharpness levels to the reliability indicator calculation portion 177.

The reliability indicator calculation portion 177 calculates the reliability indicators of the respective feature maps on the basis of the normalized similarities of the feature maps supplied from the similarity normalization portion 173 and the normalized sharpness levels of the feature maps supplied from the sharpness normalization portion 176, and supplies the normalized sharpness levels to the subject map generation portion 71.

Description of Subject Tracking Processing

However, when a user wants to take an image through the image processing device 11, the user operates the user interface 37 so as to issue an instruction to start the image capturing processing. Then, the control unit 34 operates the respective units of the image processing device 11 in response to the control signal which is supplied from the user interface 37 through the interface control unit 36.

For example, the control unit 34 allows the imager 32 to capture the input image, and simultaneously allows the digital signal processing unit 33 to perform various kinds of processing such as preprocessing, thereby obtaining the input image from the digital signal processing unit 33. Then, the control unit 34 sequentially supplies the acquired input images of the respective frames through the interface control unit 36 to the user interface 37 so as to display the input images.

With such a configuration, a user determines a composition while viewing the input images displayed as so-called preview images on the user interface 37, and operates the user interface 37 so as to be able to issue an instruction to capture a still image or the like.

At this time, the user operates a button serving as the user interface 37, thereby applying the operation mode of the image processing device 11 to the subject tracking processing mode in which the outline surrounding the tracking target subject is displayed. When the instruction to apply the operation mode thereof to the subject tracking processing mode is received and the user designates a predetermined region on the input image as the subject region, the subject tracking section 55 starts the subject tracking processing of tracking the subject in the designated region, and specifies the subject region in each frame of the input image.

Then, when receiving the supply of the coordinate information representing the position of the subject region from the subject tracking section 55, on the basis of the coordinate information, the control unit 34 supplies the outline indicating the subject region to the user interface 37 so as to display the outline. In such a manner, the outline of the subject region is displayed, together with the input image, on the user interface 37.

Next, the subject tracking processing performed by the subject tracking section 55 will be described with reference to the flowchart of FIG. 9. The subject tracking processing is started when the user designates the subject region in the subject tracking processing mode.

In step S11, the subject map generation portion 71 performs the subject map generation processing so as to generate the subject map, and supplies the subject map to the subject-candidate region squaring portion 72.

Figure 10:
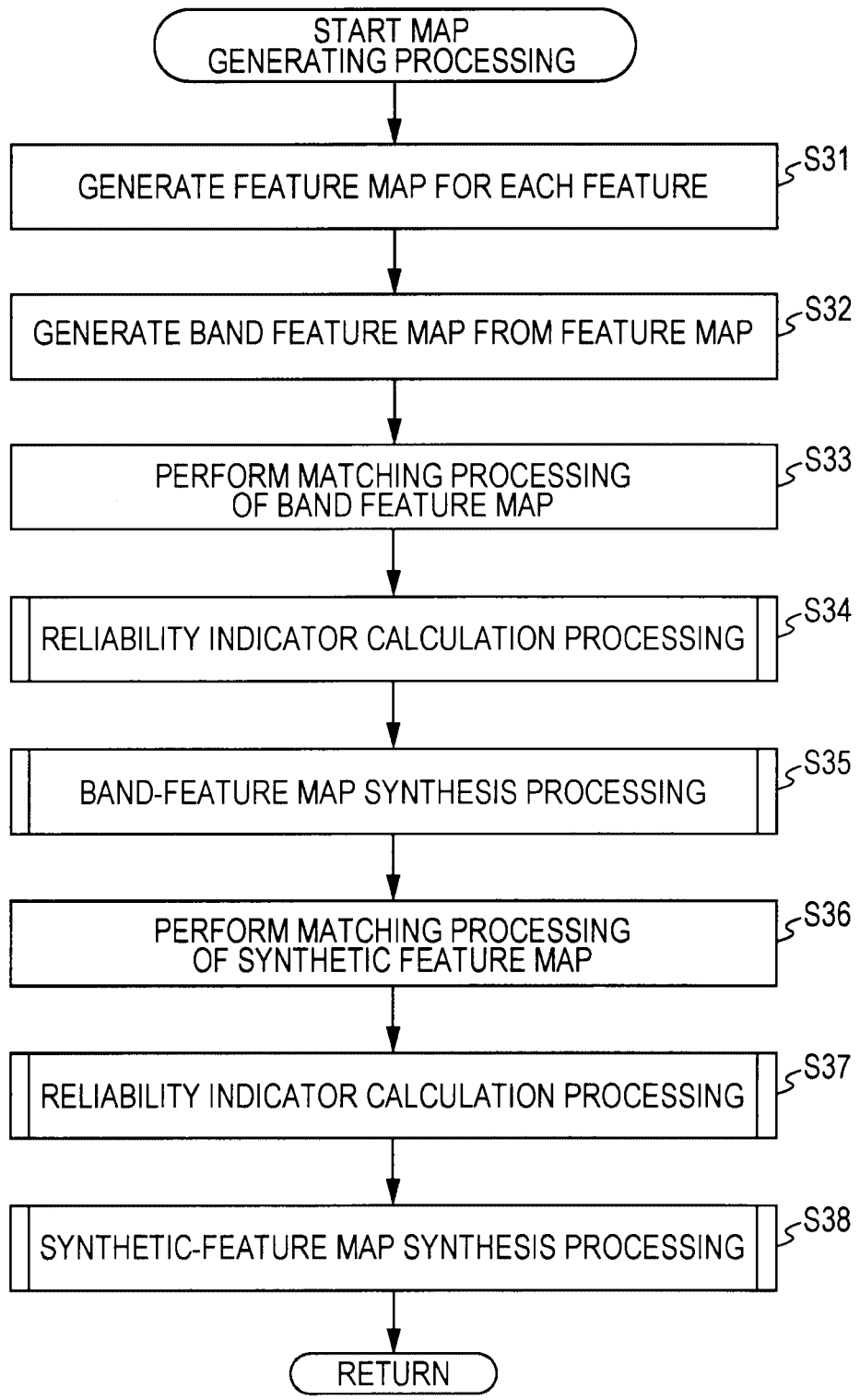
FIG. 10 is a flowchart illustrating subject map generation processing.

Hereinafter, the subject map generation processing corresponding to the processing of step S11 will be described in detail with reference to FIGS. 10 to 20. FIG. 10 is a flowchart illustrating the subject map generation processing.

In step S31 of FIG. 10, the feature map generation portion 111 of the subject map generation portion 71 generates the feature map for each feature such as luminance or color from the input image of the current frame as the processing target, and supplies to the feature map to the band-feature map generation portion 112.

Figure 11:
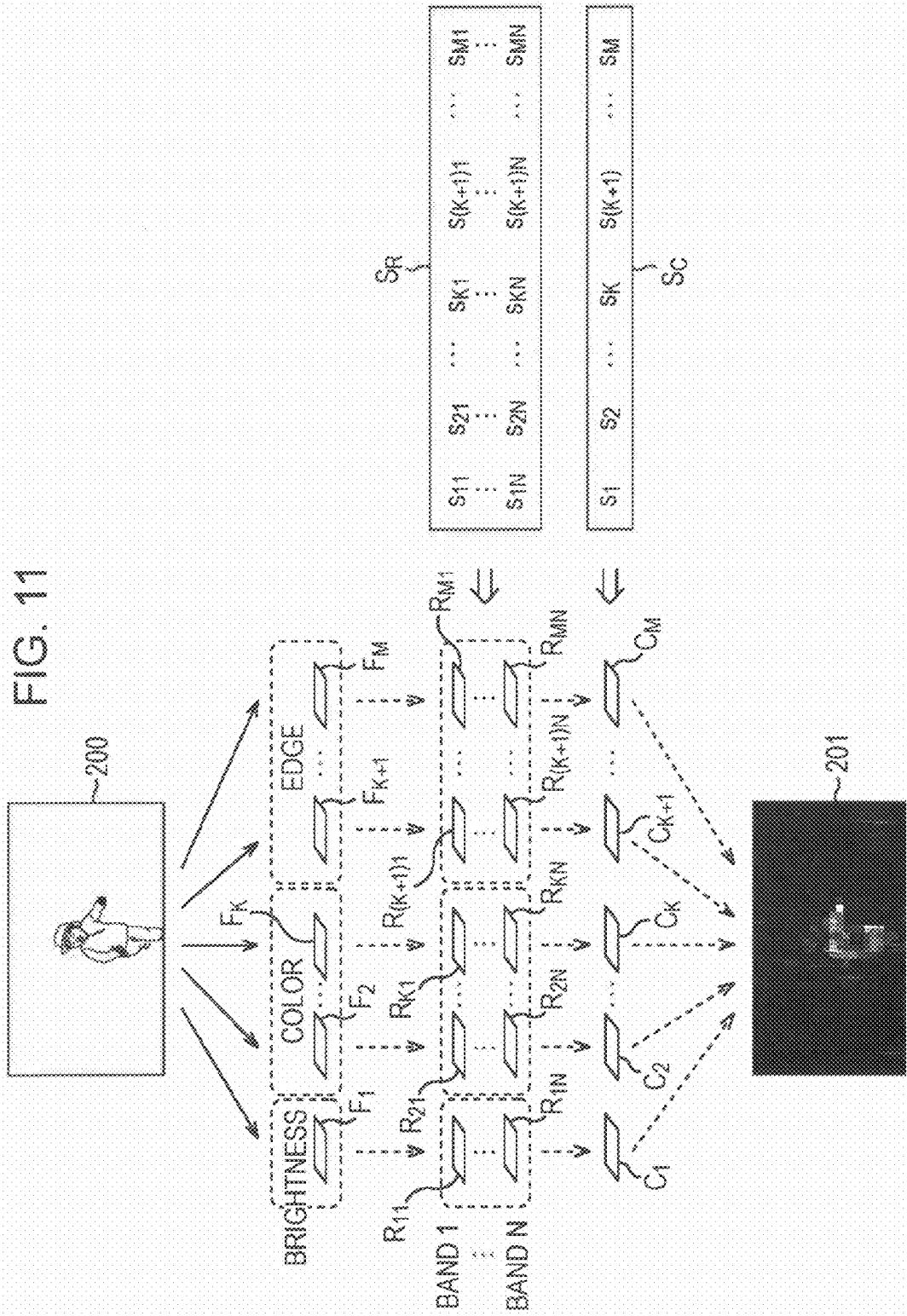
FIG. 11 is a diagram illustrating a specific example of the subject map generation processing.

Specifically, as shown in FIG. 11, from the input image 200, a total of M types of feature maps are generated, which includes: a luminance feature map $F_1$ representing the information on luminance, color feature maps $F_2$ to $F_K$ representing the information on colors, and edge feature maps $F_{(K+1)}$ to $F_M$ representing the information on edges.

For example, in the luminance feature map $F_1$, luminance components (luminance signals) Y, which can be obtained from the respective pixels of the input image, are treated as pixel values of the pixels of the feature map $F_1$ at the same positions as the pixels of the input image. That is, the luminance feature map $F_1$ is a feature map of which the feature is luminance and which represents the luminance values of the respective regions of the input image.

Further, in the color feature maps $F_2$ to $F_K$, for example, the color components (color signals) R, G, and B, which can be obtained from the respective pixels of the input image, are treated as the pixel values of the pixels of the feature map at the same positions as the pixels of the input image. In this case, at K=4, the respective feature maps $F_2$ to $F_4$ are treated as feature maps of which the respective features are R, G, and B components of the pixels of the input image and which are pixel values of the respective color components of the regions of the input image.

Moreover, in the edge feature maps $F_{(K+1)}$ to $F_M$, for example, the edge intensities of the respective pixels of the input image in the directions of 0, 45, 90, and 135 degrees are treated as pixel values of the pixels of the feature map at the same positions as the pixels of the input image. In this case, for each of four edge directions, a feature map is generated, in which the edge intensity of the direction is a feature and which represents the edge intensity of each region of the input image.

In addition, in the above-mentioned feature map, the average of the values of the R, G, and B components of pixels may be set as the feature amount of the feature map $F_1$. In addition, color difference components Cr and Cb or a* and b* coordinate components in the Lab color space may be set as the feature amounts of the color feature maps $F_2$ to $F_K$. Further, the edge intensities of directions other than the directions of 0, 45, 90, and 135 degrees may be set as the feature amounts of the edge feature maps $F_{(K+1)}$ to $F_M$.

In step S32, the band-feature map generation portion 112 extracts specific band components from the feature map so as to generate band feature maps for each feature map, and supplies the band feature maps to the band-feature map synthesis portion 113, the reference map retaining portion 74, and the matching processing portion 75.

Specifically, as shown in FIG. 11, the luminance information of prescribed bands 1 to N are extracted from the luminance information (pixel values) of the luminance feature map $F_1$ so as to generate band feature maps $R_{11}$ to $R_{1N}$ representing the luminance information of bands.

Further, the color information of the prescribed bands 1 to N are extracted from the color information (pixel values) of the color feature maps $F_2$ to $F_K$ so as to generate band feature maps $R_{21}$ to $R_{2N}$, ..., $R_{K1}$ to $R_{KN}$ representing the color information of the bands.

Moreover, the edge information of the prescribed bands 1 to N are extracted from the edge information (pixel values) of the edge feature maps $F_{(K+1)}$ to $F_M$ so as to generate band feature maps $R_{(K+1)1}$ to $R_{(K+1)N}$, ..., $R_{M1}$ to $R_{MN}$ representing the edge information of the bands. As described above, the band-feature map generation portion 112 generates M×N types of the band feature maps.

Hereinafter, an example of the processing of the band-feature map generation portion 112 will be described.

For example, the band-feature map generation portion 112 generates plural feature maps with resolutions different from each other by using the feature maps, and sets the feature maps with different resolutions as pyramid images of the feature amounts. For example, the pyramid images of 8 resolution ranks of levels L1 to L8 are generated, in which the pyramid image of the level L1 has a highest resolution and the resolution of each pyramid image becomes lower in order from the level L1 to the level L8.

In this case, the feature map, which is generated by the feature map generation portion 111, is treated as the pyramid image of the level L1. Further, in the pyramid image of the level Li (where 1≤i≤7), the average of the pixel values of four pixels adjacent to each other is treated as a pixel value of one pixel of the pyramid image of the level L (i+1) corresponding to the four pixels. Accordingly, the pyramid image of the level L (i+1) becomes an image of which the aspect ratio is a half of the pyramid image of the level Li (the decimal part of the divided aspect ratio is truncated if it is aliquant).

Further, the band-feature map generation portion 112 selects two pyramid images with mutually different ranks among the plural pyramid images, and generates N difference images of the respective feature amounts by calculating the difference between the selected pyramid images. In addition, since the sizes (the number of pixels) of the pyramid images with the respective ranks are different, at the time of generating the difference images, the smaller pyramid image is up-converted to the larger pyramid image.

For example, the band-feature map generation portion 112 calculates, among the pyramid images of the feature amounts of the respective ranks, the differences between pyramid images of combinations of respective ranks of the levels L6 and L3, the levels L7 and L3, the levels L7 and L4, the levels L8 and L4, and the levels L8 and L5. Thereby, it is possible to obtain a total of 5 difference images of the feature amounts.

Specifically, for example, when the difference image of the combination of level L6 and level L3 is generated, the pyramid image of the level L6 is up-converted to the size of the pyramid image of the level L3. That is, the pixel value of one pixel of the pyramid image of the level L6 before the up-conversion is treated as the pixel values of several adjacent pixels of the pyramid image of the level L6 after the up-conversion, corresponding to the pixel. Then, the differences between the pixel values of the pixels of the pyramid image of the level L6 and the pixel values of the pixels of the pyramid image of the level L3 located at the same position as the corresponding pixels are calculated, and the differences are treated as the pixel values of the pixels of the difference image.

The respective N difference images, which can be obtained in such a manner, are further up-converted to the size of the input image as necessary, and are treated as the respective band feature maps of the bands 1 to N.

As described above, by generating the difference images, as if the filter processing using a band-pass filter is applied to the feature maps, it is possible to extract feature amounts of specific band components from the feature maps. The pixel values of the pixels of the difference image obtained in such a manner represent the differences between the pixel values of the pyramid images with the respective ranks, that is, the differences between the feature amounts of features in the prescribed pixels in the input image and the average feature amounts of the peripheries of the pixels.

For example, when the feature is the luminance, the pixel values of the difference image (the band feature map) represent differences between the luminance levels of the prescribed regions of the input image and the average luminance level of the peripheral regions. In general, the region, of which the luminance difference from the periphery thereof is large in the image, is a region noticeable to the observer of the image, and thus the region is highly likely to be the subject region. Accordingly, it may be said that, in each difference image (the band feature map), the pixel with a larger pixel value represents a region which is more highly likely to be the subject region. Likewise, in the cases of other features, the region, of which the feature amount difference is large as compared with the periphery thereof, is a region noticeable to a user, and thus it may be also said that the region is a region more similar to the subject.

In addition, in the above description, the width of the band extracted from the feature map depends on the combination of the respective ranks of the pyramid images at the time of generating the difference images, and the combination is optionally determined. Further, the extraction of the feature amounts of the prescribed band components is not limited to the method using the above-mentioned difference image, and another method may be used therein.

Returning to the description of the flowchart of FIG. 10, in step S33, the matching processing portion 75 performs the matching processing of matching the band feature maps $R_{mn}$ (where 1≤m≤M and 1≤n≤N), which are supplied from the band-feature map generation portion 112, with the band reference maps stored in the memory 81.

Figure 12:
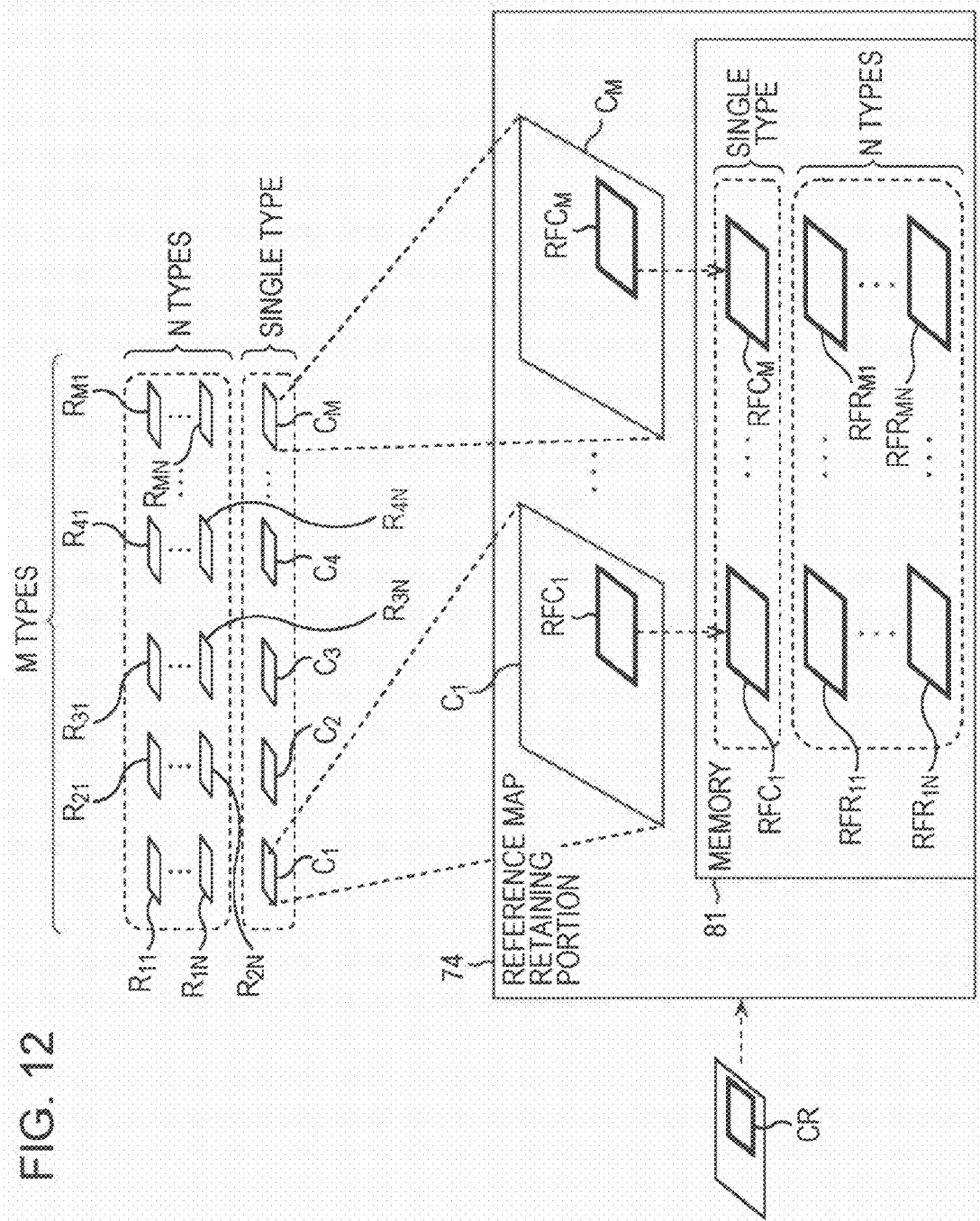
FIG. 12 is a diagram illustrating a reference map.

For example, as shown in FIG. 12, in the band-feature map generation portion 112, a total of M×N band feature maps $R_{mn}$ can be obtained from the M types of the respective features for each of N bands. Further, in the band-feature map synthesis portion 113, for each of the M types of the features, it is possible to obtain the synthetic feature map $C_m$ (where 1≤m≤M) which can be obtained by synthesizing the band feature maps.

Then, in the memory 81 of the reference map retaining portion 74, the region, which is at the same position as the subject region CR on the input image in each synthetic feature map $C_m$, is stored as the synthetic reference map $RFC_m$ (where 1≤m≤M). Further, in the memory 81, the region, which is at the same position as the subject region CR on the input image in each band feature map $R_{mn}$, is stored as the band reference map $RFR_{mn}$ (where 1≤m≤M and 1≤n≤N).

Here, the band reference maps and the synthetic reference maps stored in the memory 81 can be obtained from the band feature maps and the synthetic feature maps of the frame just previous to the current frame as the processing target.

When each band feature map $R_{mn}$ of the current frame is supplied from the band-feature map generation portion 112, the matching processing portion 75 searches the band feature map $R_{mn}$ for the region most similar to the band reference map $RFR_{mn}$ of the previous frame read out from the memory 81.

Figure 13:
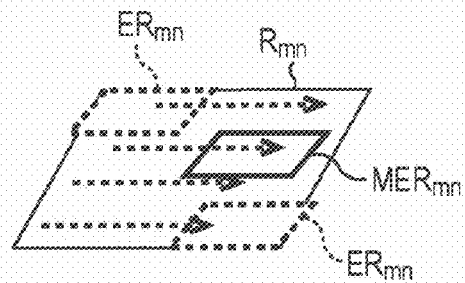
FIG. 13 is a diagram illustrating matching processing.

For example, as shown in FIG. 13, the matching processing portion 75 shifts the position of the region $ER_{mn}$ (where $1 \leq m \leq M$ and $1 \leq n \leq N$) as the processing target on the band feature map $R_{mn}$, from the upper left side to the lower right side of the drawing while matching each region $ER_{mn}$ with each band reference map $RFR_{mn}$.

Specifically, the matching processing portion 75 calculates, for each pixel within the region $ER_{mn}$, an absolute value of difference between the pixel value of the pixel of the region $ER_{mn}$ and the pixel value of the pixel of the band reference map $RFR_{mn}$ which is at the same position as the pixel of the region $ER_{mn}$. Then, the matching processing portion 75 calculates the sum of absolute differences (SAD) each of which is obtained for each pixel.

The matching processing portion 75 sets the region, in which the sum of absolute differences between itself and the band reference map is the minimum, among the regions $ER_{mn}$ of the band feature map $R_{mn}$ as the most similar region $MER_{mn}$ (where $1 \leq m \leq M$ and $1 \leq n \leq N$). Then, the matching processing portion 75 supplies the information representing the position of the most similar region $MER_{mn}$ and the sum of absolute differences obtained for each region $ER_{mn}$ of the band feature map $R_{mn}$ as the result of the matching processing to the reliability indicator calculation portion 76.

Figure 14:
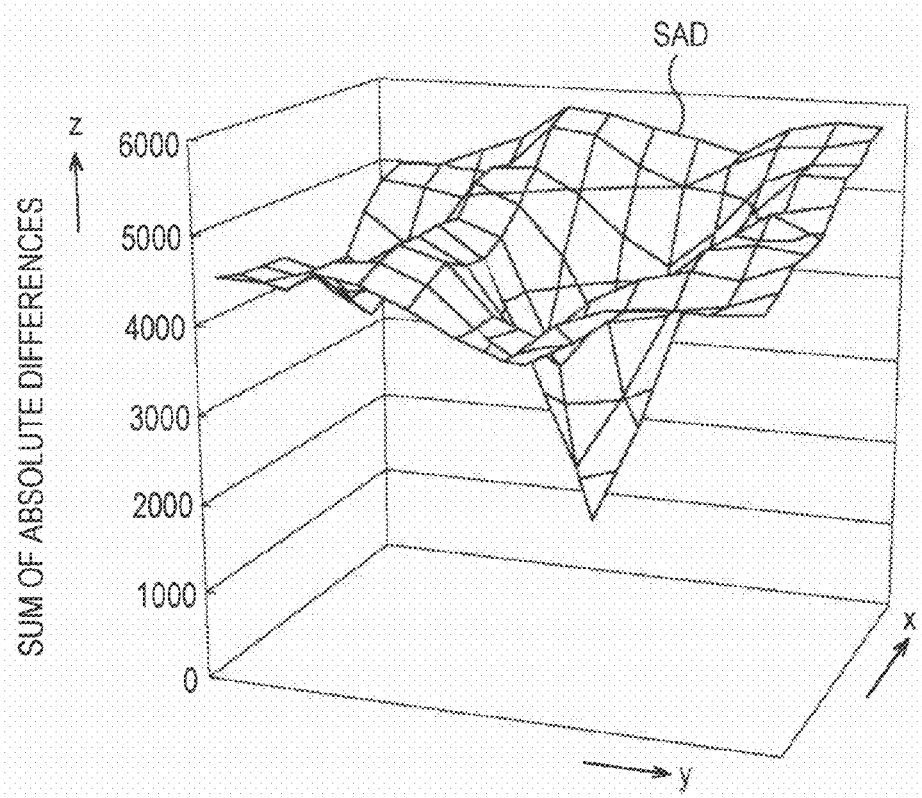
FIG. 14 is a diagram illustrating an example of a result of the matching processing.

FIG. 14 shows an example of the sum of absolute differences obtained for each region $ER_{mn}$ of the band feature map $R_{mn}$ as the result of the matching processing.

In FIG. 14, the xy-coordinate plane formed of the x axis and the y axis represents the entire region of the band feature map. Further, in FIG. 14, the z axis perpendicular to the xy-coordinate plane represents the magnitude of the sum of absolute differences of the band feature map, and thus scale marks of 0 to 6000 are assigned on the z axis. That is, the figure SAD shown in the xyz-coordinate space of FIG. 14 represents the sum of absolute differences for each region $ER_{mn}$ of the band feature map $R_{mn}$. It should be noted that the figure SAD is hereinafter referred to as the sum of absolute differences SAD.

As shown in FIG. 14, the values of the sum of absolute differences for the entire band feature map ranges from about 1500 to about 5800. However, the values are 4000 or more in the marginal portion of the band feature map, and are 2000 or less in the center portion thereof. In particular, in the region (the edge portion of the sum of absolute differences SAD) in the center portion of the band feature map, the value of the sum of absolute differences is a minimum value (a peak value). That is, the sum of absolute differences SAD of FIG. 14 represents that the region in the center portion of the band feature map is the most similar region.

In such a manner, as the result of the matching processing, the sum of absolute differences are obtained for each of the M×N band feature maps $R_{mn}$, and each most similar region $MER_{mn}$ is specified for each of the M×N band feature maps $R_{mn}$. Then, the information representing the sum of absolute differences and the position of the most similar region of each band feature map is supplied to the reliability indicator calculation portion 76.

Here, description was given of the case where the sum of absolute differences is used as the matching processing. However, any kind of processing, such as the matching processing using the squared differences, the histogram matching, or the template matching, may be used if only the region most similar to the band reference map can be specified.

Returning to the flowchart of FIG. 10, in step S34, the reliability indicator calculation portion 76 performs the reliability indicator calculation processing so as to calculate the reliability indicators (the band reliability indicators) of the band feature maps of the current frame, and supplies the indicators to the subject map generation portion 71.

Figure 15:
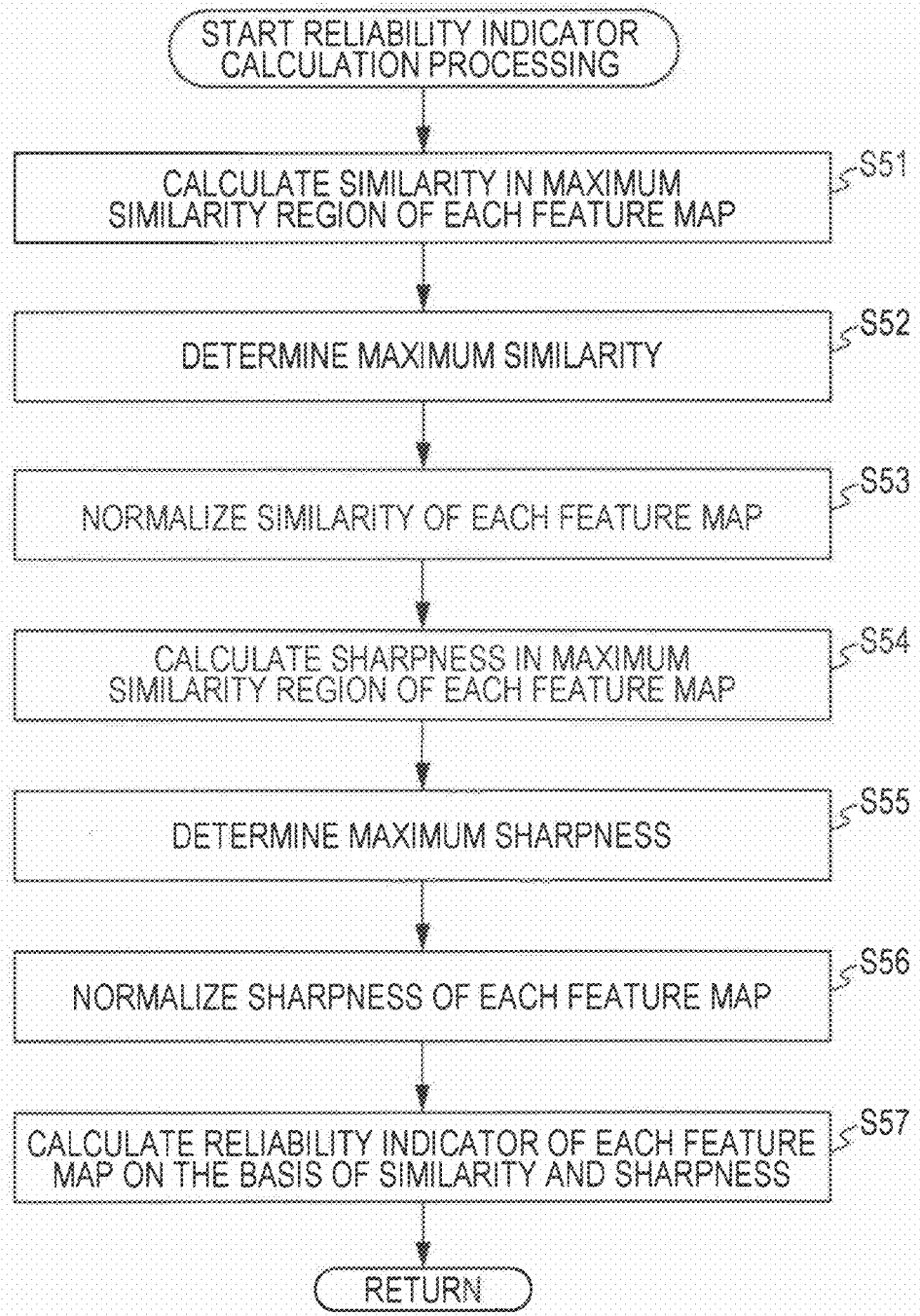
FIG. 15 is a flowchart illustrating reliability indicator calculation processing.

Hereinafter, the reliability indicator calculation processing corresponding to the processing of step S34 will be described in detail with reference to the flowchart of FIG. 15.

In step S51, the similarity calculation portion 171 calculates, on the basis of the result of the matching processing supplied from the matching processing portion 75, the similarity $LR_{mn}$ (where $1 \leq m \leq M$ and $1 \leq n \leq N$) between the most similar region $MER_{mn}$ and the band reference map $RFR_{mn}$ of the previous frame for each of the M×N band feature maps $R_{mn}$ of the current frame. Then, the similarity calculation portion 171 supplies the similarity to the maximum similarity determination portion 172.

Here, as described above, when the sum of absolute differences is used in the matching processing, assuming that the minimum value (the peak value) in the sum of absolute differences SAD shown in FIG. 14 is an $SAD_{min}$, as the minimum value $SAD_{min}$ decreases, the similarity $LR_{mn}$ increases. Specifically, for example, the similarity $LR_{mn}$ is given by $1/SAD_{min}$ which is the inverse of the minimum value of the sum of absolute differences of the band feature map.

In step S52, the maximum similarity determination portion 172 determines the M maximum similarities $MLR_m$ (where $1 \leq m \leq M$) for the M types of the feature amounts from the similarities $LR_{mn}$ of the respective band feature maps supplied from the similarity calculation portion 171, and supplies the maximum similarities $MLR_m$ to the similarity normalization portion 173 together with the similarities $LR_{mn}$ of the band feature maps.

In step S53, the similarity normalization portion 173 normalizes the similarity $LR_{mn}$ of each band feature map on the basis of the maximum similarity $MLR_m$ of each of the M types of the feature amounts supplied from the maximum similarity determination portion 172, and supplies the similarity to the reliability indicator calculation portion 177. Specifically, the value $LR_{mn}/MLR_m$, which is obtained by dividing the similarity $LR_{mn}$ of each band feature map by the maximum similarity $MLR_m$ for each of M types of feature amounts, is supplied as the normalized similarity $SLR_{mn}$ (where $1 \leq m \leq M$ and $1 \leq n \leq N$) to the reliability indicator calculation portion 177. In addition, the normalized similarity $SLR_{mn}$ has a value in the range of $0 < SLR_{mn} \leq 1$.

For example, at m=1, when the similarities $LR_{11}$ to $LR_{1N}$ of the band feature maps $R_{11}$ to $R_{1N}$ of the luminance are divided by the maximum similarity $MLR_1$, it is possible to obtain the values of $LR_{11}/MLR_1$ to $LR_{1N}/MLR_1$ as N normalized similarities $SLR_{1N}$. The same processing is performed at m=2, ..., M, thereby obtaining the M×N normalized similarities $SLR_{mn}$.

Here, the similarity $LR_{mn}$ of each band feature map is normalized by the maximum similarity $MLR_m$, and it is apparent that the similarity $LR_{mn}$ may be normalized by other representative values.

In step S54, the sharpness calculation portion 174 calculates, on the basis of the result of the matching processing supplied from the matching processing portion 75, the sharpness level $TR_{mn}$ (where $1 \leq m \leq M$ and $1 \leq n \leq N$) of each of the M×N band feature maps $R_{mn}$ of the current frame, and supplies the sharpness level to the maximum sharpness determination portion 172.

Here, as described above, in the case of using the sum of absolute differences in the matching processing, the sharpness level $TR_{mn}$ is given by $SAD_{ave}-SAD_{min}$ which is a difference between the minimum value $SAD_{min}$ of the sum of absolute differences SAD shown in FIG. 14 and the average value $SAD_{ave}$ of the sum of absolute differences of the near-field regions including the most similar region. As the sharpness level $TR_{mn}$ is larger, the sum of absolute differences SAD shown in FIG. 14 has a sharper shape in the region with the minimum value. Accordingly, as the sharpness level $TR_{mn}$ is smaller, it has a smoother shape.

In step S55, the maximum sharpness determination portion 172 determines the M maximum sharpness levels $MTR_m$ (where $1 \leq m \leq M$) for M types of the feature amounts on the basis of the sharpness levels $TR_{mn}$ of the respective band feature maps which are supplied from the sharpness calculation portion 174, and supplies the maximum sharpness levels $MTR_m$ together with the sharpness levels $TR_{mn}$ of the respective band feature map to the sharpness normalization portion 176.

In step S56, the sharpness normalization portion 176 normalizes the sharpness level $TR_{mn}$ of each band feature map on the basis of the maximum sharpness level $MTR_m$ of each of the M types of the feature amounts supplied from the maximum sharpness determination portion 175, and supplies the sharpness level to the reliability indicator calculation portion 177. Specifically, the value $TR_{mn}/MTR_m$, which is obtained by dividing the sharpness level $TR_{mn}$ of each band feature map by the maximum sharpness level $MTR_m$ for each of M types of feature amounts, is supplied as the normalized sharpness level $STR_{mn}$ (where $1 \leq m \leq M$ and $1 \leq n \leq N$) to the reliability indicator calculation portion 177. In addition, the normalized sharpness level $STR_{mn}$ has a value in the range of $0 < STR_{mn} \leq 1$.

For example, at m=1, when the sharpness levels $TR_{11}$ to $TR_{1N}$ of the band feature maps $R_{11}$ to $R_{1N}$ are divided by the maximum sharpness level $MTR_1$, it is possible to obtain the values of $TR_{11}/MTR_1$ to $TR_{1N}/MTR_1$ as N normalized sharpness levels $STR_{1N}$. The same processing is performed at m=2, ..., M, thereby obtaining the M×N normalized sharpness levels $STR_{mn}$.

Here, the sharpness level $TR_{mn}$ of each band feature map is normalized by the maximum sharpness level $MTR_m$, and it is apparent that the sharpness level $TR_{mn}$ may be normalized by other representative values.

In step S57, the reliability indicator calculation portion 177 calculates the band reliability indicator $s_{mn}$ (where $1 \leq m \leq M$ and $1 \leq n \leq N$) of each band feature map on the basis of the normalized similarity $SLR_{mn}$ supplied from the similarity normalization portion 173 and the normalized sharpness level $STR_{mn}$ supplied from the sharpness normalization portion 176. On the basis of the normalized similarity $SL_{mn}$ and the normalized sharpness level $STR_{mn}$, the band reliability indicator $s_{mn}$ is given by the following Expression (1).

$$s_{mn}=f(SL_{mn}, TL_{mn}) \quad (1)$$

Here, in the Expression (1), the f(A, B) represents a function of values A and B. Specifically, for example, the band reliability indicator $s_{mn}$ is given by the following Expression (2).

$$s_{mn}=\alpha SL_{mn}+\beta TL_{mn} \quad (2)$$

Here, in Expression (2), the values α and β are set to predetermined values.

On the basis of Expression (2), as the similarity and the sharpness level is larger, the band reliability indicator $s_m$, has a larger value. That is, in the sum of absolute differences SAD shown in FIG. 14, as the minimum value $SAD_{min}$ is smaller and the shape thereof in the region at the minimum value is sharper, the band reliability indicator $s_{mn}$ has a larger value.

Figure 16:
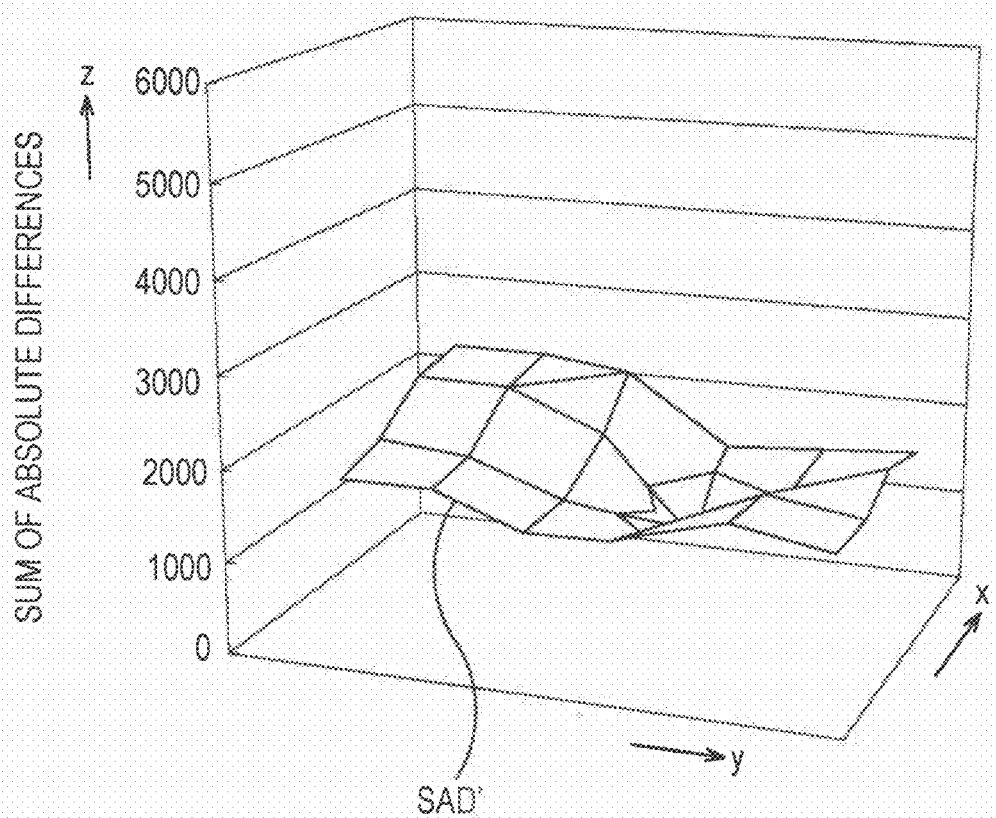
FIG. 16 is a diagram illustrating another example of the result of the matching processing.

On the other hand, in the sum of absolute differences SAD' of the band feature map shown in FIG. 16, the minimum value thereof is smaller than the minimum value of the sum of absolute differences of FIG. 14, and the shape thereof in the region at the minimum value is smoother. That is, the similarity is large, but the sharpness level is small, and thus the band reliability indicator $s_{mn}$ has a small value.

As described above, the M×N band reliability indicators $s_{mn}$ corresponding to the M×N band feature maps $R_{nm}$ are obtained, and are supplied as a band reliability indicator group $S_R$ to the band-feature map synthesis portion 113 of the subject map generation portion 71.

It should be noted that the values α and β, which determine the band reliability indicator $s_{mn}$, may have the same values for each of the M×N band feature maps $R_{mn}$, but may have different values for each feature or for each band.

Returning to the description of the flowchart of FIG. 10, in step S35, the band-feature map synthesis portion 113 performs the band-feature map synthesis processing. Thereby, as shown in FIG. 11, the band-feature map synthesis portion 113 generates the synthetic feature maps $C_m$ from the band feature maps $R_{mn}$ supplied from the band-feature map generation portion 112, on the basis of the band reliability indicator group $S_R$ supplied from the reliability indicator calculation portion 76. Then, the band-feature map synthesis portion 113 supplies the synthetic feature maps $C_m$ to the synthetic-feature map synthesis portion 114, the reference map retaining portion 74, and the matching processing portion 75.

Figure 17:
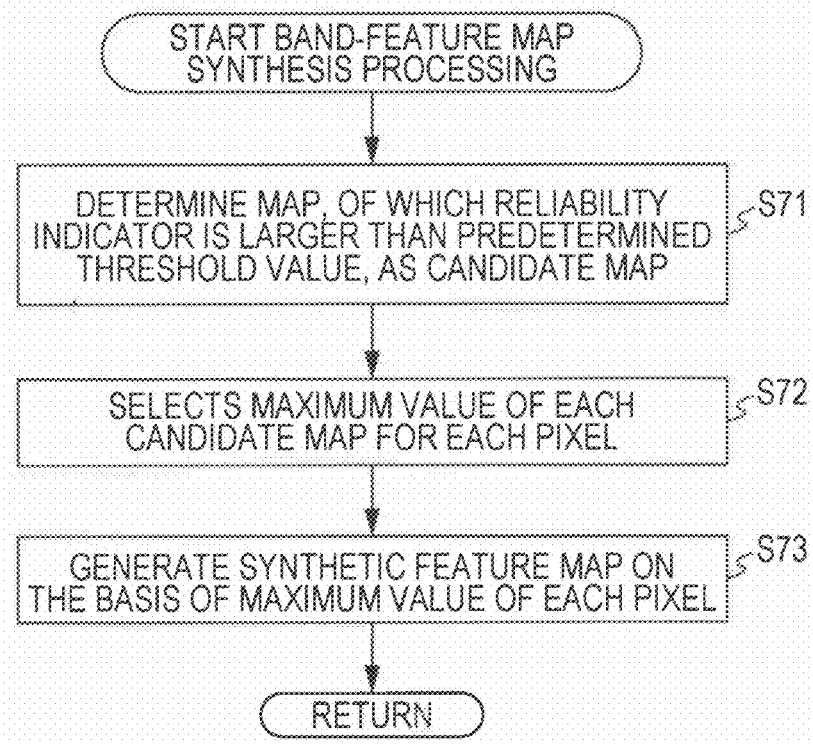
FIG. 17 is a diagram illustrating band-feature map synthesis processing.

Here, the band-feature map synthesis processing corresponding to the processing of step S35 will be described in detail with reference to the flowchart of FIG. 17. The band-feature map synthesis processing is performed for each of M types of feature amounts.

In step S71, the candidate map determination portion 121 determines the band feature maps, of which the band reliability indicators $s_{mn}$ supplied from the reliability indicator calculation portion 76 are larger than the predetermined threshold value, among the band feature maps $R_{mn}$ supplied from the band-feature map generation portion 112 as candidate maps (band candidate maps). The candidate map determination portion 121 supplies the determined band candidate maps to the inter map maximum selection portion 122.

Figure 18:
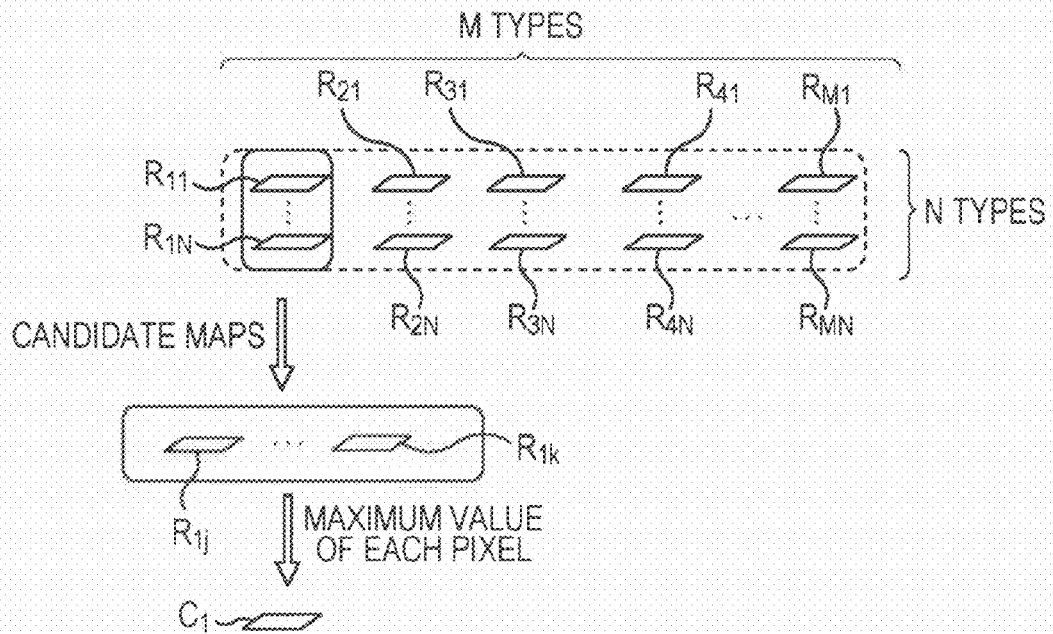
FIG. 18 is a diagram illustrating a specific example of the band-feature map synthesis processing.

Specifically, for example, as shown in FIG. 18, among the band feature maps $R_{11}$ to $R_{1N}$ of the luminance, the band feature maps $R_{1j}$, ..., $R_{1k}$, of which the band reliability indicators $s_{11}$ to $s_{1N}$ are larger than the predetermined threshold value, are determined as the band candidate maps.

In step S72, the inter map maximum selection portion 122 selects the maximum feature amount (the pixel value) among the band candidate maps, for each pixel, from the band candidate maps supplied from the candidate map determination portion 121, and performs this selection on all pixels.

Specifically, in the case of the band candidate maps $T_{1j}$, ..., $R_{1k}$ shown in FIG. 18, the inter map maximum selection portion 122 focuses on the respective pixels which are at the same position in respective band candidate maps, selects a pixel with the maximum pixel value among the respective pixels, and performs this selection on all pixels.

In step S73, the synthetic feature map generation portion 123 generates the synthetic feature maps on the basis of the maximum pixel values each of which is selected for each pixel among the band candidate maps by the inter map maximum selection portion 122.

Specifically, by synthesizing the maximum pixel values each of which corresponds to each pixel of the band candidate maps $R_{1j}, \ldots, R_{1k}$ shown in FIG. 18 (by employing the maximum pixel values as the pixel values of the respective pixels), the synthetic feature maps $C_m$ are generated. Then, the synthetic feature maps $C_m$ are supplied to the synthetic-feature map synthesis portion 114, the reference map retaining portion 74, and the matching processing portion 75.

As described above, the band-feature map synthesis portion 113 generates the M types of the synthetic feature maps $C_m$. In addition, more specifically, in each synthetic feature map, the pixel values of the pixels are normalized so as to be in the range of for example 0 to 255. Further, in the first subject map generation processing, each band reliability indicator $s_{mn}$ of the band reliability indicator group $S_R$ is treated as 1, and the maximum values of the respective pixels are selected from the respective band feature maps of each feature amount.

Returning to the description of the flowchart of FIG. 10, in step S36, the matching processing portion 75 performs the matching processing of matching the synthetic feature map $C_m$ (where $1 \le m \le M$) supplied from the band-feature map synthesis portion 113 and the synthetic reference map $RFC_m$ (where $1 \le m \le M$) stored in the memory 81.

Here, in the matching processing of the synthetic feature map $C_m$, the same processing as the matching processing of the band feature map is performed.

That is, for example, the matching processing portion 75 shifts the position of the region $EC_m$ (where $1 \le m \le M$) as the processing target on the synthetic feature map $C_m$ while calculating the sum of absolute differences between the pixel values of the pixels of the region $EC_m$ and the synthetic reference map $RFC_m$. Then, the matching processing portion 75 sets the region, in which the sum of absolute differences between itself and the synthetic reference map is the minimum, among the region $EC_m$ of the synthetic feature map $C_m$ as the most similar region $MEC_m$ (where $1 \le m \le M$). The matching processing portion 75 supplies the information representing the position of the most similar region $MEC_m$ and the sum of absolute differences obtained for each region $EC_m$ of the synthetic feature map $C_m$ as the result of the matching processing to the reliability indicator calculation portion 76.

In step S37, the reliability indicator calculation portion 76 performs the reliability indicator calculation processing so as to calculate the reliability indicators (the synthetic reliability indicators) of the synthetic feature maps of the current frame, and supplies the indicators to the subject map generation portion 71.

Here, the processing of calculating the reliability indicators of the synthetic feature maps is performed basically in the same way as the processing of calculating the reliability indicators of the band feature maps described with reference to the flowchart of FIG. 15, and thus detailed description thereof will be omitted.

That is, in the processing of calculating the reliability indicators of the band feature maps, first, on the basis of the result of the matching processing supplied from the matching processing portion 75, the similarities $LC_m$ (where $1 \le m \le M$) between the reference maps of the previous frame and the most similar regions $MEC_m$ of the M synthetic feature maps $C_m$ of the current frame are calculated. Next, from the similarities $LC_m$ of the respective synthetic feature maps, the maximum similarities $MLC_m$ are determined, and on the basis of this, the M normalized similarities $SLC_m$ are obtained.

On the other hand, on the basis of the result of the matching processing obtained from the matching processing portion 75, the sharpness levels $TC_m$ (where $1 \le m \le M$) of the M synthetic feature maps $C_m$ of the current frame is calculated. Next, from the sharpness levels $TC_m$ of the respective synthetic feature maps, the maximum sharpness levels $MTC_m$ are determined, and on the basis of this, the M normalized sharpness levels $STC_m$ are obtained.

Then, on the basis of the normalized similarity $SLC_m$ and the normalized sharpness level $STC_m$, the synthetic reliability indicators $s_m$ (where $1 \le m \le M$) of the respective synthetic feature maps are obtained.

As described above, the M synthetic reliability indicators $s_m$ of the M synthetic feature maps are obtained, and are supplied as a synthetic reliability indicator group $S_c$ to the synthetic-feature map synthesis portion 114 of the subject map generation portion 71.

In step S38, the synthetic-feature map synthesis portion 114 performs the synthetic-feature map synthesis processing. Thereby, as shown in FIG. 11, the synthetic-feature map synthesis portion 114 generates the subject map 201 from the synthetic feature map $C_m$ supplied from the band-feature map synthesis portion 113, on the basis of the synthetic reliability indicator group $S_c$ supplied from the reliability indicator calculation portion 76. Then, the synthetic-feature map synthesis portion 114 supplies the subject map 201 to the subject-candidate region squaring portion 72.

Figure 19:
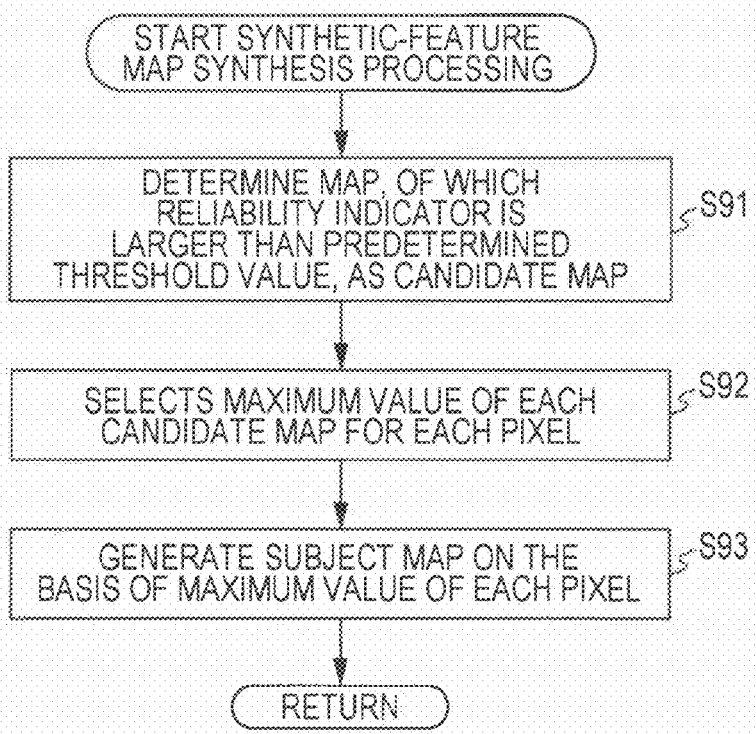
FIG. 19 is a flowchart illustrating synthetic-feature map synthesis processing.

Here, the synthetic-feature map synthesis processing corresponding to the processing of step S38 will be described in detail with reference to the flowchart of FIG. 19.

In step S91, the candidate map determination portion 124 determines the synthetic feature maps, of which the synthetic reliability indicators $s_m$ supplied from the reliability indicator calculation portion 76 are larger than the predetermined threshold value, among the synthetic feature maps $C_m$ supplied from the band-feature map synthesis portion 113 as candidate maps (synthetic candidate maps). The candidate map determination portion 124 supplies the determined synthetic candidate maps to the inter map maximum selection portion 125.

Figure 20:
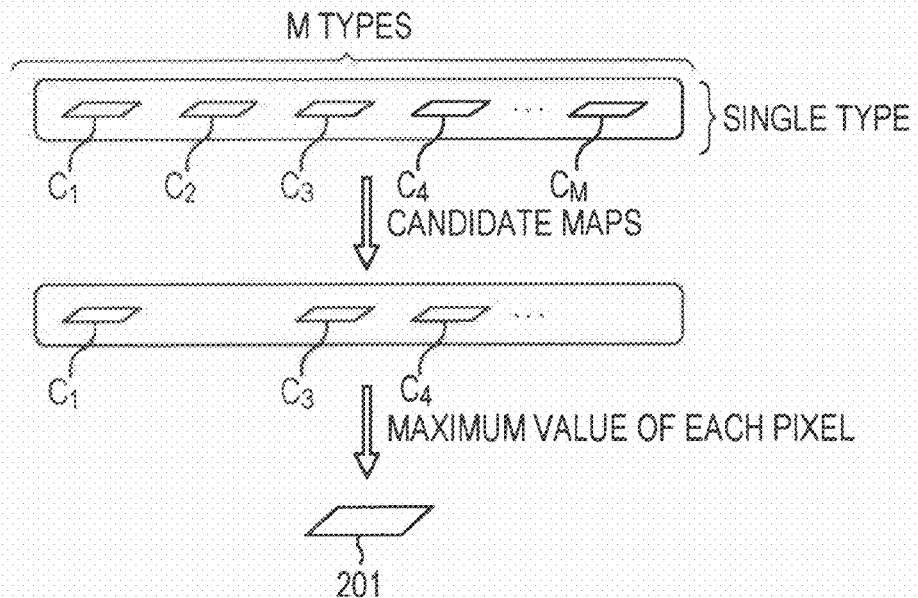
FIG. 20 is a diagram illustrating a specific example of the synthetic-feature map synthesis processing.

Specifically, for example, as shown in FIG. 20, among the M synthetic feature maps $C_1$ to $C_M$, the synthetic feature maps $C_1, C_3, C_4, \ldots$ of which the synthetic reliability indicators $s_1$ to $s_M$ are larger than the predetermined threshold value, are determined as the synthetic candidate maps.

In step S92, the inter map maximum selection portion 125 selects the maximum feature amount (the pixel value) among the synthetic candidate maps, for each pixel, from the synthetic candidate maps supplied from the candidate map determination portion 124, and performs this selection on all pixels.

Specifically, in the case of the synthetic candidate maps $C_1, C_3, C_4, \ldots$ shown in FIG. 20, the inter map maximum selection portion 125 focuses on the respective pixels which are at the same position in respective synthetic candidate maps, selects a pixel with the maximum pixel value among the respective pixels, and performs this selection on all pixels.

In step S93, the subject map generation portion 126 generates the subject map on the basis of the maximum pixel values each of which is selected for each pixel among the synthetic candidate maps by the inter map maximum selection portion 125.

Specifically, by synthesizing the maximum pixel values each of which corresponds to each pixel of the synthetic candidate maps $C_1, C_3, C_4, \ldots$ shown in FIG. 20 (by employing the maximum pixel values as the pixel values of the respective pixels), the subject map 201 is generated. Then, the subject map 201 is supplied to the subject-candidate region squaring portion 72.

The pixel values of the respective pixels of the subject map, which can be obtained in such a manner, are normalized so as to be in the range of for example 0 to 255, and the subject map is treated as the final subject map.

In addition, in the first subject map generation processing, each synthetic reliability indicator $s_m$ of the synthetic reliability indicator group $S_C$ is treated as 1, and the maximum values of the respective pixels are selected from the respective synthetic feature maps.

Figure 9:
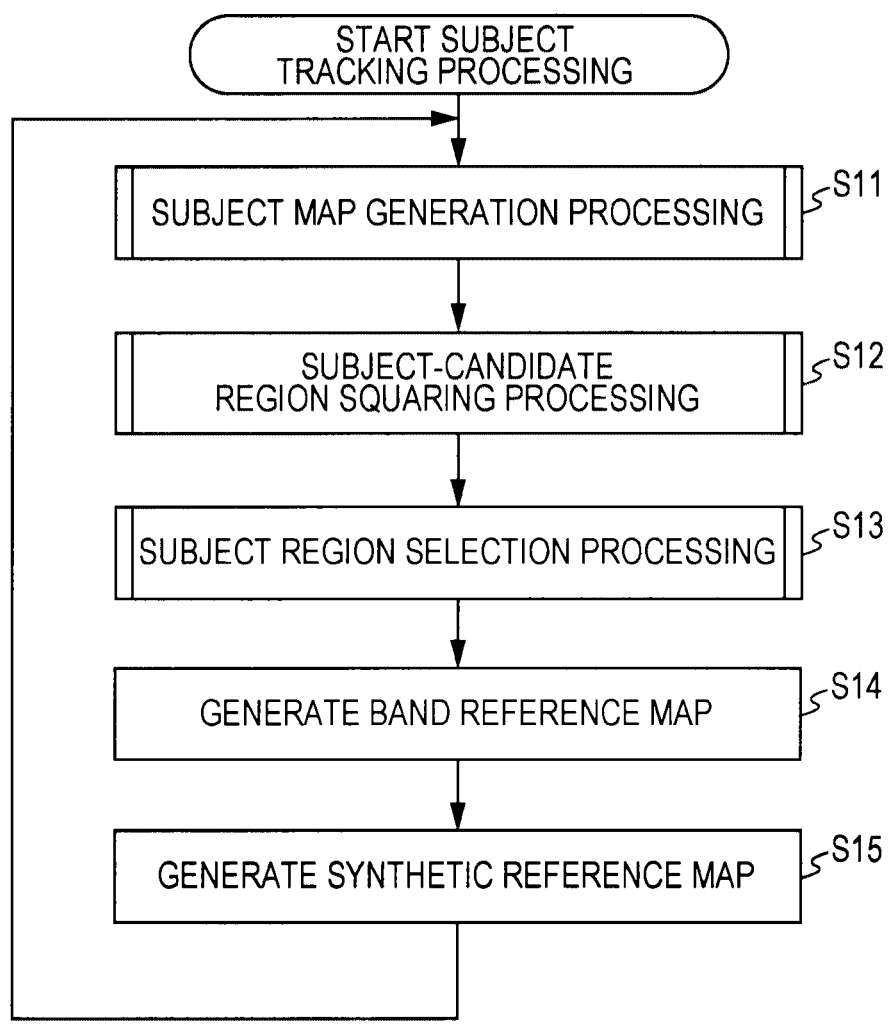
FIG. 9 is a flowchart illustrating subject tracking processing.

When the subject map is generated, the subject map generation processing ends, and then the processing advances to step S12 of FIG. 9.

Returning to the flowchart of FIG. 9, in step S12, the subject-candidate region squaring portion 72 performs the subject-candidate region squaring processing, thereby determining the subject candidate regions on the subject map supplied from the subject map generation portion 71.

Figure 21:
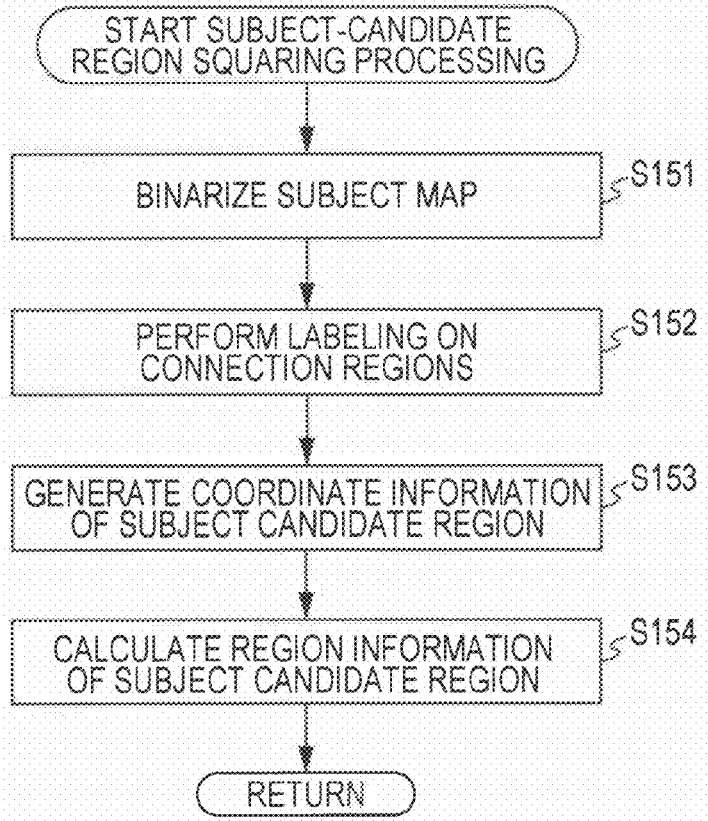
FIG. 21 is a flowchart illustrating subject-candidate region squaring processing.

Hereinafter, referring to FIGS. 21 and 22, the subject-candidate region squaring processing will be described in detail. FIG. 21 is a flowchart illustrating the subject-candidate region squaring processing. FIG. 22 is a diagram illustrating a specific example of the subject-candidate region squaring processing.

In step S151 of the flowchart of FIG. 21, the binarization processing portion 131 of the subject-candidate region squaring portion 72 binarizes the pixel values of the pixels of the subject map supplied from the synthetic-feature map synthesis portion 114 through threshold value processing, and supplies the binary pixel values to the labeling processing portion 132.

More specifically, when the pixel values of the respective pixels of the subject map 201 ranges from 0 to 255, as shown in FIG. 22, the binarization processing portion 131, for example, sets the pixel values, which are smaller than a threshold value of "127", to 0, and sets the pixel values, which are larger than the threshold value of "127", to 1.

In such a manner, it is possible to obtain a binarized map 202 of the second picture from the top in FIG. 22. The binarized map 202 shown in FIG. 22 is the binarized subject map. In the binarized map 202, the white color portions represent the pixels of which the pixel values are 1, and the black color portion represents the pixels of which the pixel values are 0. Here, the threshold value is set to 127, but may be set to a different value.

In step S152, the labeling processing portion 132 performs the morphological operation on the binarized map 202 supplied from the binarization processing portion 131, squares the subject region on the binarized map 202, and performs the labeling on the connection regions which are obtained.

Specifically, the labeling processing portion 132 performs the labeling on the connection regions, which are adjacent to each other and are formed of the pixels with the pixel values of 1, in the binarized map 202 (the binarized subject map). For example, as shown in the third picture from the top of FIG. 22, the label of "1" is attached to the connection region 211 on the binarized map 202, and the label of "2" is attached to the connection region 212. The labeling processing portion 132 supplies the labeled binarized map (the subject map) to the rectangular region coordinate calculation portion 133.

In step S153, the rectangular region coordinate calculation portion 133 sets the rectangular region, which surrounds the connection regions on the binarized map 202 supplied from the labeling processing portion 132, as the subject candidate region, and generates the coordinate information representing the position of the subject candidate region.

Specifically, as shown in the fourth picture from the top of FIG. 22, in the binarized map 202, the rectangular area (the circumscribed area) 221, which surrounds the connection region 211 labeled by "1" from its outer side, is detected, and is set as a subject candidate region. In addition, for example, in the drawing of the subject candidate region, the coordinates of the upper-left and lower-right vertexes are obtained, and the coordinates thereof are set as coordinate information.

Further, the rectangular area 222, which surrounds the connection region 212 labeled by "2" from its outer side, is detected, and is set as a subject candidate region. Thus, in the drawing of the subject candidate region, the coordinates of the upper-left and lower-right vertexes are generated as coordinate information.

The rectangular region coordinate calculation portion 133 generates the coordinate information of each subject candidate region, and then supplies the coordinate information to the region information calculation portion 134.

In step S154, the region information calculation portion 134 calculates the region information of each subject candidate region by using the coordinate information supplied from the rectangular region coordinate calculation portion 133 and the subject map supplied from the synthetic-feature map synthesis portion 114.

For example, the region information calculation portion 134 calculates, as region information, the sizes of the subject candidate regions and the coordinates of the center positions of the subject candidate regions in the subject map.

Further, the region information calculation portion 134 calculates, as region information, the integral value (summation) of the pixel values of the pixels within the subject candidate regions on the subject map or the peak value (maximum value) of the pixel values of the pixels within the subject candidate regions on the subject map.

The region information calculation portion 134 calculates the region information on each subject candidate region, supplies the coordinate information and the region information of each subject candidate region which can be obtained, to the subject region selection portion 73, and ends the subject-candidate region squaring processing. Thereafter, the processing advances to step S13 of FIG. 9.

Returning to the flowchart of FIG. 9, in step S13, the subject region selection portion 73 performs the subject region selection processing, thereby selecting the subject region from the subject candidate regions.

Here, referring to the flowchart of FIG. 23, the subject region selection processing of step S13 will be described in detail.

In step S171, the region information comparing portion 151 compares the region information of each subject candidate region supplied from the region information calculation portion 134 with the region information of the subject region of the just previous frame stored in the region information storage portion 153. Then, the region information comparing portion 151 supplies the comparing result and the coordinate information of each subject candidate region supplied from the region information calculation portion 134 to the subject region determination portion 152.

Specifically, for example, when the sizes of the subject candidate regions are calculated as the region information, the region information comparing portion 151 compares the sizes of subject candidate regions, that is, the sizes of the rectangular areas surrounding the subject candidate regions with the size of the subject region of the just previous frame.

In this case, for example, the absolute difference between the size of each subject candidate region and the size of the subject region can be obtained as a comparing result.

Further, for example, the coordinates of the center positions of the subject candidate regions are obtained as the region information, and the coordinates of each center position are compared with the coordinates of the center positions of the subject region of the just previous frame. In this case, the distance between the center positions can be obtained as the comparing result.

Moreover, when the peak value and the integral value of the pixel values of the pixels within the subject candidate region are obtained, the absolute difference between the peak value or the integral value of the subject candidate region and the peak value or the integral value of the subject region of the just previous frame can be obtained as the comparing result.

In step S172, the subject region determination portion 152 selects one of the subject candidate regions as the subject region in the current frame of the processing target on the basis of the comparing result supplied from the region information comparing portion 151. In other words, when a specific feature, that is, the region information is set as an indicator, among the subject candidate regions of the current frame, the subject candidate region, which is most highly correlated with the subject region of the previous frame, is treated as the subject region of the current frame.

Specifically, for example, the subject candidate region with the smallest absolute differences of the region information, which can be obtained as the comparing result, is selected as the subject region. Here, the differences include the difference between the sizes of the subject candidate region and the subject region, the difference between the center positions thereof, the difference between the peak values thereof, and the difference between the integral values thereof.

Further, the subject region determination portion 152 determines the subject region of the current frame, and then supplies the coordinate information of the subject candidate region set as the subject region to the control unit 34 and the reference map retaining portion 74, the coordinate information being supplied from the region information comparing portion 151. Moreover, the subject region determination portion 152 supplies and stores the region information of the subject region to and in the region information storage portion 153, and ends the subject region selection processing. Then, the processing advances to step S14 of FIG. 9.

In addition, in the first subject region selection processing, the region information storage portion 153 does not store the region information of the subject region of the just previous frame. Hence, the subject candidate regions including the first selection region, which is selected by a user at the time of the start of the subject tracking processing, is treated as the subject region.

Returning to the flowchart of FIG. 9, in step S14, the reference map retaining portion 74 generates the band reference maps on the basis of the coordinate information of the subject region supplied from the subject region determination portion 152 and the band feature maps supplied from the band-feature map generation portion 112.

Specifically, the reference map retaining portion 74 cuts out, as described with reference to FIG. 12, the regions with the same area as the subject region on the input image in the band feature maps $R_{mn}$ of the current frame, and sets the cutout regions as the band reference maps $RFR_{mn}$ (where $1 \leq m \leq M$ and $1 \leq n \leq N$). The reference map retaining portion 74 supplies and stores the generated band reference maps to and in the memory 81. The band reference maps are used in calculating the band reliability indicators of the subsequent frame.

In step S15, the reference map retaining portion 74 generates the synthetic reference maps on the basis of the coordinate information of the synthetic feature map supplied from the band-feature map synthesis portion 113 and the subject region supplied from the subject region determination portion 152.

That is, similarly to the generation of the band reference map, the reference map retaining portion 74 cuts out the regions with the same area as the subject region on the input image in the synthetic feature maps $C_m$ of the current frame, and sets the cutout regions as the synthetic reference map $RFC_m$ (where $1 \leq m \leq M$). The reference map retaining portion 74 supplies and stores the generated synthetic reference maps to and in the memory 81. The synthetic reference maps are used in calculating the synthetic reliability indicators of the subsequent frame.

In step S15, when the synthetic reference maps are generated, thereafter, the processing returns to step S11, and the above-mentioned processing is repeated. That is, the subject tracking processing is performed on the subsequent frames, and thus the processing is repeated for each one frame.

In the above-mentioned processing, for each frame, from each feature map of the frame, the regions, which are highly correlated with the subject region of the previous frame in the map, are detected. In response to the detection result, the reliability indicator for the map is calculated, and the subject map is generated from the maximum values of the respective pixels of the feature maps with the high reliability indicators.

In the detection of the subject using the subject map, the regions, which are more highly correlated with the subject region of the just previous frame, are continuously and adaptively treated as important. Hence, even under circumstances, in which the subject state changes, such as the case in which the light illuminated on the subject changes and the case in which the pose of the subject changes, as compared with the methods of performing the tracking on the basis of the feature amounts of the initially designated region in the related art, it is possible to more stably track the subject.

Moreover, since the subject map is generated from the plural feature amounts extracted from the input image, even when the feature amounts of several features drastically changes, if the changes in the feature amounts of the other features are small, it is possible to detect the subject with sufficient accuracy, and thus it is possible to perform stabilized tracking.

Further, since the subject region is determined so as to include the entire subject, even under circumstances in which a partial region of the subject changes, it is possible to more stably track the subject.

In particular, in the subject tracking methods in the related art, in the case of indentifying the coordinates (or a partial region including the coordinates) of something within the subject region, the entire subject is not tracked, and thus it is difficult to correctly set the detection ranges of the AF (Auto Focus), the AE (Auto Exposure), and the ACC (Auto Color Control). Further, in the case of indentifying the feature amount region in which the feature amounts are identical in the subject region, it is possible to improve the accuracy in setting the detection range as compared with the above-mentioned case. However, the identical feature amount region is mostly just a small portion of the subject region, and thus it is difficult to obtain sufficient detection accuracy.

On the other hand, in the subject tracking processing according to the embodiment of the invention, it is possible to identify the subject region including the entire subject, and thus the detection accuracy can be improved. Consequently, it is possible to apply the tracking result to various applications.

Further, in the subject tracking methods in the related art, for example, there is the method of detecting and tracking a person for example by registering an entire image of the person in a dictionary through learning. However, it is difficult to track the subjects other than the person registered in the dictionary. Moreover, the volume of the information (the image) which is registered in the dictionary becomes huge, and thus the size of the apparatus increases.

In contrast, in the subject tracking processing of the embodiment of the invention, it is possible to detect and track an optional subject, and besides it is not necessary to register the huge volume of the information in the dictionary or the like. Hence, it is possible to make the size of the apparatus compact.

Further, for example, when the band feature maps of the specific bands generated in the band-feature map generation processing of the subject map generation processing are synthesized by a simple linear combination, in the band feature maps, the subject component (that is, the feature amount of a small region of a texture), which originally tends to be attenuated, near direct current is further attenuated by the simple linear combination. In this case, as the subject has a comparatively simple shape, it may be more difficult to obtain the levels of the feature amounts particularly in the center portion of the subject region. In addition, in the binarization processing of the subject-candidate region squaring processing in the subsequent stage, there is a concern about an adverse effect that it is difficult to obtain correct connection regions.

However, in the subject tracking processing according to the embodiment of the invention, by selecting any one of the pixels among feature maps, the subject map is generated. Therefore, it is possible to obtain any feature amount in the subject region of the subject map. Accordingly, even when the subject has a comparatively simple shape, it is possible to avoid the situation in which it is difficult to obtain the feature amount in the subject part. Thus, in the binarization processing, it is possible to specify correct connection regions, and it is also possible to perform stable subject tracking.

Moreover, in the subject tracking processing according to the embodiment of the invention, the regions (the most similar regions), which are highly correlated with the subject region of the previous frame in feature maps, are detected, and in response to the detection result, the reliability indicators for the feature maps are calculated, thereby generating the subject map from the feature maps (the candidate maps) of which the reliability indicators are larger than the predetermined threshold value. Therefore, it is possible to exclude the feature maps, of which the reliability indicators are smaller than the predetermined threshold value, that is, the feature maps, which are less correlated with the subject region of the previous frame, from the subject map generation processing. Accordingly, since it is possible to lower the possibility that a region different from the real subject region is determined as the subject region, it is possible to more accurately specify the subject.

Further, in the band-feature map synthesis processing and the synthetic-feature map synthesis processing, by performing the threshold value processing on the reliability indicators of the respective feature maps, the candidate maps are determined. However, by performing the threshold value processing on the reliability indicator for each pixel unit of each feature map, the candidate pixels, which are candidates to be synthesized as the synthetic feature map or the subject map, may be determined.

In this case, the threshold value is changed depending on whether or not each processing target pixel is included in the most similar region on the feature map. Specifically, for the pixels not included in the most similar region, by setting the threshold value to be high, even in the case of the pixels of the feature maps of which the reliability indicators are relatively high, the pixels are less likely to be included in the subject region, and thus it is possible to exclude the pixels from the candidate pixels. In contrast, for the pixels included in the most similar region, by setting the threshold value to be low, even in the case of the pixels of the feature maps of which the reliability indicators are relatively low, the pixels are highly likely to be included in the subject region, and thus it is possible to employ the pixels as the candidate pixels. In this way, the maximum values of the respective pixels are selected from the determined candidate pixels, and on the basis of the pixels of the maximum values, the synthetic feature map or the subject map is generated. Thereby, it is possible to lower the possibility that a region different from the real subject region is determined as the subject region, it is possible to further more accurately specify the subject.

Moreover, in the band-feature map synthesis processing and the synthetic-feature map synthesis processing, the maximum feature amount among the candidate maps is selected for each pixel from the candidate maps, but the feature amount is not limited to the maximum value. For example, the second highest value or the median may be selected as the feature amount of each pixel among the candidate maps. In such a manner, it is possible to exclude the pixels which have locally large feature amounts caused by disturbance although not in the subject region.

In the above description, the luminance component, the color component, and the edge intensity are used as the feature amounts, but the feature amounts are not limited to this. For example, motion information may be added. Further, as available feature amounts, for example, feature amounts, which have complementary relationship like the luminance component and the color component, are appropriate, and the feature amounts may be arbitrarily selected.

Further, in the above description, for the respective M×N band feature maps and M synthetic feature maps, the respective reliability indicators are calculated, and the reliability indicators of a part of the maps may be properly calculated. For example, only the synthetic reliability indicators of the M synthetic feature maps of the synthetic feature maps $C_1$ to $C_M$ may be calculated. In such a case, it is possible to suppress computational complexity in the image processing device 11.

Moreover, in the above description, by calculating the similarities and sharpness levels from the sum of absolute differences of the feature maps, on the basis of them, the reliability indicators are calculated. However, when the sum of absolute differences is not used in the matching processing, by using a predetermined statistical method on the basis of the result of the matching processing, the degrees of distribution of the feature amounts in the vicinities of the most similar regions on the feature maps of the processing target frame may be calculated, and the reliability indicators, which are large as the degrees of distribution are small, may be calculated.

Moreover, in the current frame of the processing target, only the regions with a predetermined size including the subject region of the previous frame are set as the processing target regions, and the matching processing of the band feature maps or the synthetic feature maps may be performed thereon. In such a case, when the sizes or the positions of the processing target regions are changed in accordance with the size or the moving speed of the subject which is tracked in the previous frame, it is possible to more efficiently and more reliably detect the region which is highly correlated.

The above-mentioned series of processing may be performed by hardware, and may be performed by software. When the series of processing is performed by software, the programs constituting the software are installed from a program recording medium in a computer built in the dedicated hardware or for example a general personal computer capable of performing various functions by installing various programs.

FIG. 24 is a block diagram illustrating an exemplary configuration of the hardware of the computer which performs the above-mentioned series of processing through a program.

In the computer, a CPU (Central Processing Unit) 301, a ROM (Read Only Memory) 302, and a RAM (Random Access Memory) 303 are connected to each other through a bus 304.

The bus 304 is further connected to an input/output interface 305. The input/output interface 305 is connected to: an input portion 306 which is formed of a keyboard, a mouse, a microphone, and the like; an output portion 307 which is formed of a display, a speaker, and the like; a storage portion 308 which is formed of a hard disk, non-volatile memory, and the like; a communication portion 309 which is formed of a network interface and the like; and a drive 310 which drives a removable medium 311 such as a magnetic disk, an optical disc, a magneto-optical disk, or a semiconductor memory.

In the computer configured as described above, for example, the CPU 301 loads and executes the program, which is stored in the storage portion 308, in the RAM 303 through the input/output interface 305 and the bus 304, thereby performing the above-mentioned series of processing.

The program executed by the computer (the CPU 301) is stored in the removable medium 311 which is a package medium formed as, for example, the magnetic disk (including a flexible disk), the optical disc (CD-ROM (Compact Disc-Read Only Memory), or DVD (Digital Versatile Disc)), the magneto-optical disk, the semiconductor memory, or the like. Alternatively, the program is provided through a wired or wireless transmission medium such as a local area network, the Internet, or a digital satellite broadcast.

In addition, the program can be installed in the storage portion 308 through the input/output interface 305 by mounting the removable medium 311 in the drive 310. Further, the program can be installed in the storage portion 308 by allowing the communication portion 309 to receive the program through the wired or wireless transmission medium. Besides, the program can be installed in advance in the ROM 302 or the storage portion 308.

In addition, the program executed by the computer may be a program which chronologically performs the processing in order of description of the present specification, and may be a program which performs the processing in parallel or at necessary timing such as the timing of calling.

The present application contains subject matter related to that disclosed in Japanese Priority Patent Application JP 2010-022812 filed in the Japan Patent Office on Feb. 4, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device that specifies a region including a specific subject on each input image of a plurality of continuous frames, the image processing device comprising:
   subject map generation means that, from feature maps corresponding to features of respective pixels of the input image and representing feature amounts in respective regions of the input image, selects one feature amount of any of the feature maps for each pixel so as to thereby generate a subject map representing similarities of the respective regions of the input image to the subject;
   subject region specification means that, on the basis of the subject map, specifies a subject region, which is a region most similar to the subject, in the subject map so as to thereby specify a region which includes the subject on the input image; and
   reliability calculation means that calculates reliabilities as indicators indicating that corresponding regions, which correspond to the subject region of a frame previous to a processing target frame, on the feature maps includes the subject, on the basis of degrees of distribution of the feature amounts in near-field regions which include the corresponding regions on the feature maps of the processing target frame,
   wherein the subject map generation means generates the subject map by selecting one feature amount of any of the feature maps for each pixel on the basis of the reliabilities of the respective feature maps.

2. The image processing device according to claim 1, further comprising:
   reference map retaining means that retains regions, which are at the same positions as the subject region in the feature maps, as reference maps; and
   matching processing means that searches the feature maps of the processing target frame for most similar regions which are most highly correlated with the reference maps of the previous frame,
   wherein the reliability calculation means calculates the reliabilities as indicators indicating that the most similar regions on the feature maps includes the subject, on the basis of the degrees of distribution of the feature amounts in the near-field regions which include the most similar regions on the feature maps of the processing target frame.

3. The image processing device according to claim 1, wherein the subject map generation means generates the subject map by selecting one feature amount of any of the feature maps, of which the reliabilities are larger than a predetermined threshold value, for each pixel.

4. The image processing device according to claim 1, wherein the subject map generation means includes
   feature map generation means that extracts the feature amounts from the input image so as to thereby generate the feature maps in the respective regions of the input image,
   band feature map generation means that, for each of a plurality of bands, extracts a component of the band from the feature maps so as to thereby generate band feature maps as the feature maps representing the components of the bands,
   band-feature map synthesis means that synthesizes the band feature maps for each of the feature amounts so as to thereby generate synthetic feature maps, and synthetic-feature map synthesis means that synthesizes the synthetic feature maps so as to thereby generate the subject map as another feature map, wherein the reliability calculation means calculates the reliabilities of the synthetic feature maps on the basis of degrees of distribution of synthetic feature amounts in the near-field regions, which correspond to the subject region of the previous frame, on the synthetic feature maps of the processing target frame, and wherein the synthetic-feature map synthesis means generates the subject map by selecting one synthetic feature amount of any of the synthetic feature maps for each pixel on the basis of the reliabilities of the respective synthetic feature maps and by synthesizing the synthetic feature amounts for all pixels.

5. The image processing device according to claim 4, wherein the reliability calculation means calculates the reliabilities of the band feature maps on the basis of degrees of distribution of band feature amounts in the near-field regions, which correspond to the subject region of the previous frame, on the band feature maps of the processing target frame, and wherein the band-feature map synthesis means generates the synthetic feature maps by selecting one band feature amount of any of the band feature maps for each pixel on the basis of the reliabilities of the respective band feature maps and by synthesizing the band feature amounts for all pixels.

6. The image processing device according to claim 1, wherein the subject map generation means generates the subject map by selecting the maximum feature amount among the feature maps for each pixel.

7. An image processing method of an image processing device that specifies a region including a specific subject on each input image of a plurality of continuous frames and includes subject map generation means that, from feature maps corresponding to features of respective pixels of the input image and representing feature amounts in respective regions of the input image, selects one feature amount of any of the feature maps for each pixel so as to thereby generate a subject map representing similarities of the respective regions of the input image to the subject, and subject region specification means that, on the basis of the subject map, specifies a subject region, which is a region most similar to the subject, in the subject map so as to thereby specify a region which includes the subject on the input image, the image processing method comprising the steps of:

generating the subject map representing the similarities of the respective regions of the input image to the subject, through the subject map generation means, by selecting one feature amount of any of the feature maps for each pixel from the feature maps corresponding to the features of the respective pixels of the input image and representing the feature amounts in respective regions of the input image; and specifying the region, which includes the subject on the input image, through the subject region specification means, by specifying the subject region, which is the region most similar to the subject in the subject map, on the basis of the subject map calculating with a computer reliabilities as indicators indicating that corresponding regions, which correspond to the subject region of a frame previous to a processing target frame, on the feature maps includes the subject, on the basis of degrees of distribution of the feature amounts in near-field regions which include the corresponding regions on the feature maps of the processing target frame, wherein the generating includes generating the subject map by selecting one feature amount of any of the feature maps for each pixel on the basis of the reliabilities of the respective feature maps.

8. A non-transitory computer readable medium having an image processing program stored therein that specifies a region including a specific subject on each input image of a plurality of continuous frames, the image processing program causing a computer to execute processing comprising the steps of:

generating a subject map representing similarities of respective regions of the input image to the subject, by selecting one feature amount of any of feature maps for each pixel from the feature maps corresponding to features of the respective pixels of the input image and representing the feature amounts in the respective regions of the input image; and specifying a region, which includes the subject on the input image, by specifying a subject region, which is a region most similar to the subject in the subject map, on the basis of the subject map calculating with the computer reliabilities as indicators indicating that corresponding regions, which correspond to the subject region of a frame previous to a processing target frame, on the feature maps includes the subject, on the basis of degrees of distribution of the feature amounts in near-field regions which include the corresponding regions on the feature maps of the processing target frame, wherein the generating includes generating the subject map by selecting one feature amount of any of the feature maps for each pixel on the basis of the reliabilities of the respective feature maps.

9. An image processing device that specifies a region including a specific subject on each input image of a plurality of continuous frames, the image processing device comprising:

a subject map generation portion that, from feature maps corresponding to features of respective pixels of the input image and representing feature amounts in respective regions of the input image, selects one feature amount of any of the feature maps for each pixel so as to thereby generate a subject map representing similarities of the respective regions of the input image to the subject; and a subject region specification portion that, on the basis of the subject map, specifies a subject region, which is a region most similar to the subject, in the subject map so as to thereby specify a region which includes the subject on the input image processing circuitry that calculates reliabilities as indicators indicating that corresponding regions, which correspond to the subject region of a frame previous to a processing target frame, on the feature maps includes the subject, on the basis of degrees of distribution of the feature amounts in near-field regions which include the corresponding regions on the feature maps of the processing target frame, wherein the subject map generation portion generates the subject map by selecting one feature amount of any of the feature maps for each pixel on the basis of the reliabilities of the respective feature maps.

10. The image processing device according to claim 9, wherein the processing circuitry:

retains regions, which are at the same positions as the subject region in the feature maps, as reference maps; and searches the feature maps of the processing target frame for most similar regions which are most highly correlated with the reference maps of the previous frame, and calculates the reliabilities as indicators indicating that the most similar regions on the feature maps includes the subject, on the basis of the degrees of distribution of the feature amounts in the near-field regions which include the most similar regions on the feature maps of the processing target frame.

11. The image processing device according to claim 9, wherein the subject map generation portion generates the subject map by selecting one feature amount of any of the feature maps, of which the reliabilities are larger than a predetermined threshold value, for each pixel.

12. The image processing device according to claim 9, wherein the subject map generation portion extracts the feature amounts from the input image so as to generate the feature maps in the respective regions of the input image, for each of a plurality of bands, extracts a component of the band from the feature maps so as to generate band feature maps as the feature maps representing the components of the bands, synthesizes the band feature maps for each of the feature amounts so as to generate synthetic feature maps, synthesizes the synthetic feature maps so as to generate the subject map as another feature map, calculates the reliabilities of the synthetic feature maps on the basis of degrees of distribution of synthetic feature amounts in the near-field regions, which correspond to the subject region of the previous frame, on the synthetic feature maps of the processing target frame, and generates the subject map by selecting one synthetic feature amount of any of the synthetic feature maps for each pixel on the basis of the reliabilities of the respective synthetic feature maps and by synthesizing the synthetic feature amounts for all pixels.

13. The image processing device according to claim 9, wherein the processing circuitry calculates the reliabilities of the band feature maps on the basis of degrees of distribution of band feature amounts in the near-field regions, which correspond to the subject region of the previous frame, on the band feature maps of the processing target frame, and generates the synthetic feature maps by selecting one band feature amount of any of the band feature maps for each pixel on the basis of the reliabilities of the respective band feature maps and by synthesizing the band feature amounts for all pixels.

14. The image processing device according to claim 9, wherein the processing circuit generates the subject map by selecting the maximum feature amount among the feature maps for each pixel.

\* \* \* \* \*